(12) United States Patent
Mirbaha et al.

(10) Patent No.: US 8,774,851 B2
(45) Date of Patent: Jul. 8, 2014

(54) SYSTEMS AND METHODS FOR GROUP INFORMATION SERVER AMONG MOBILE DEVICES

(75) Inventors: Ramin Mirbaha, Dachau (DE); Vahid Mirbaha, Dachau (DE)

(73) Assignee: TAKWAK GmbH (DE)

( * ) Notice: Subject to any disclaimer, the term of this patent is extended or adjusted under 35 U.S.C. 154(b) by 332 days.

(21) Appl. No.: 13/363,184

(22) Filed: Jan. 31, 2012

(65) Prior Publication Data

US 2012/0202551 A1     Aug. 9, 2012

Related U.S. Application Data

(60) Provisional application No. 61/439,729, filed on Feb. 4, 2011.

(51) Int. Cl.
*H04B 7/00*          (2006.01)

(52) U.S. Cl.
USPC .......................................... 455/518; 455/557

(58) Field of Classification Search
CPC ......... H04W 4/08; H04W 8/183; H04W 4/10; H04W 88/06
USPC .......................................... 455/518, 519, 557
See application file for complete search history.

(56) References Cited

U.S. PATENT DOCUMENTS

2005/0180394 A1   8/2005   Kautz et al.
2010/0203878 A1*   8/2010   Kim et al. ..................... 455/418

FOREIGN PATENT DOCUMENTS

EP       1 662 833 A1    5/2006

OTHER PUBLICATIONS

International Search Report issued Aug. 3, 2012 in PCT Application No. PCT/IB2012/000229.

* cited by examiner

*Primary Examiner* — Tu X Nguyen
(74) *Attorney, Agent, or Firm* — Foley & Lardner LLP; Christopher J. McKenna; Shabbi S. Khan

(57) ABSTRACT

The present solution is directed to establishing a group server for a group of mobile devices comprising a private mobile radio module. Each of the mobile devices of a group may have a private mobile radio module. A modular server unit detachable from and interfaced to a mobile device of the group is activated as a group server responsive to detaching the modular server unit from the mobile device. The modular server unit may include the private mobile radio which may be deactivated responsive to activating the modular server unit. The modular server unit may receive data from a plurality of mobile devices of the group of mobile devices and process the received data to consolidate the data. The modular server unit may transmit the consolidated data to each of the group's mobile devices.

20 Claims, 15 Drawing Sheets

WELCOME APPEARANCE (Connected Mode)

WELCOME APPEARANCE (PND Mode)

NAVIGATION APPEARANCE (Map Mode)

WIDGET SHOWS – Speed, Altitude, GPS Accuracy

NAVIGATION APPEARANCE (Tracking Mode)

WIDGET SHOWS – Current speed, total distance, elapsed time

NAVIGATION APPEARANCE (Navigation Mode)

WIDGET SHOWS – Direction to Target, Distance to Target, Time to Target

SYSTEMS AND METHODS FOR GROUP INFORMATION SERVER AMONG MOBILE DEVICES

RELATED APPLICATION

This application claims the benefit of and priority to U.S. Provisional Application No. 61/439,729, entitled "Systems And Methods For Group Information Server Among Mobile Devices" and filed on Feb. 4, 2011, which is incorporated herein by reference in its entirety.

FIELD OF THE INVENTION

The present application generally relates to mobile communication devices for outdoor activities. In particular, the present application relates to systems and methods for using a modular group information server among a plurality of mobile devices.

BACKGROUND

A user or a group of users located in an outdoor environment or participating in an outdoor activity may use mobile devices to try to communicate with each other. In such outdoor environments it may be difficult to know where the other users are located and where they are heading if communications are sporadic or interrupted. Furthermore, it may be difficult for the group of users to know the details of any one user's location, heading and surrounding environment. The lack of information may make it challenging for the group of users to track and manage the group's progress and maintain a safe and successful navigation or expedition.

BRIEF SUMMARY

The present solution provides systems and methods for sharing information with a group of users via mobile devices as the users participate in an outdoor activity or traverse an outdoor environment. The systems and methods herein allow the user to share their data as well as view data from other users. A group information share provides services for receiving, processing and distributing information and data among the group of users. By sharing information between the users, the experience, tracking and management of the outdoor activity or group activity is improved and enhanced.

Generally, the present disclosure describes a wireless multi-purpose and multi-function handheld mobile device, herein also interchangeably referred to as a mobile device or a device, may enable a user of a group of users in an outdoor environment to communicate with each other, individually as well as a group. The users may utilize the features of the mobile device to navigate through the outdoor terrain via a personal global positioning system (GPS) functions in addition communicating with other group members via a private radio communication functions, thus using the mobile device as a walky-talky operating over a range of radio frequencies. Mobile device may enable a user to connect to relevant content and social network via a cellular telephone communication functionalities for accessing the internet, such as a general packet radio service (GPRS), enhanced data rates for GSM (EDGE) or the enhanced GPRS (EGPRS), or a wireless local area network (WLAN) technology. Mobile device may also enable a user to communicate freely using radio frequency range, as a private mobile radio (PMR). For example, the users may use the device for private radio communication purposes via channels of a PMR 446 radio frequencies operating at around 446 MHz. The multipurpose and multifunction hand-held mobile device may therefore provide the user with means for navigating through the outdoors as well as for off-net/on net group communication, individual telephone communication, access to the internet and with a range of additional group community services. The device may combine GPS, PMR 446 with GSM, such as GPRS or 3G communication bearers to provide advanced group communication services on top of a standard open operating based user customizable Smart Phone.

Mobile device may be include a range of applications that are easy to use, such as a magnetic compass, outdoor activity relevant applications, such as group functions for tracking presence and location of other members of a group, as well as additional third party applications. Mobile device may include a camera or a camcorder, a light emitting diode (LED) flash light and a barometer which may be used as a barometric altimeter. Mobile device hand-held device may provide multitude of services to an outdoor enthusiast by enabling the user to use the device as a GPS navigation device, on road as well as in uninhabited areas, such as off-road areas, mountains or deserts. The device may be used by families and friends with serious outdoor sports hobbies, such as skiing, snowboarding, mountain biking, hiking or climbing, camping, caravanning, motorcycling, globetrotting, hunting, fishing, boating or river rafting.

In particular aspects of the present disclosure, a group of mobile device users involved in an outdoor expedition wishes to store, process or share expedition relevant data among other members of the group, a group information server may be used to implement these tasks. The group information server may be a modular and a mobile computing unit attachable to and detachable from a mobile device. In some embodiments, the group information server is a mobile device internally integrated with a server module to act as the group server. The group server may receive information from the mobile devices of the group, including the GPS location information, information about bearing navigation, altitude, speed, remaining battery capacity, area or path pointers, weather, updates, comments, pictures, videos or any other data which may be generated by the group during the expedition. The server may process and store the received information onto a server on an online repository for use by other users in the future or fetch such information in real time to make, generate or process any relevant data needed, such as way points, comments, pictures or maps for the group's location or area. The server may process the received information to generate a new data by combining, relating, predicting or deducing new information from the received data. The server may also process historic data to produce journals about made trips, way points, breaks, comments, pointers or guides. The processed data may be broadcasted or sent to the users or any other device as needed.

In some aspects, the present solution is directed to a method for establishing a group server for a group of mobile devices comprising a private mobile radio module. The method includes establishing a group of mobile devices. Each of the mobile devices may have a private mobile radio module to communicate with other mobile devices of the group. The method may include activating as a group server for the group of mobile device a modular server unit detachable from and interfaced to a mobile device of the group of mobile devices responsive to detaching the modular server unit from the mobile device. The modular server unit may include the private mobile radio and the private mobile radio of the mobile device may be deactivated responsive to activating the modular server unit. The method may also include receiving, by the modular server unit via the private mobile radio, data from a plurality of mobile devices of the group of mobile devices and processing the received data to consolidate the data. The modular server unit may transmit via the private mobile radio the consolidated data to each of the mobile devices of the group.

In some embodiments, the method includes sending, by the modular server unit, a signal that the modular server unit will no longer act as the group server for the group. In some embodiments, the method includes sending the signal responsive to attaching the modular server unit to the mobile device and the private mobile radio of the modular server unit is deactivated upon attachment and the private mobile radio module of the mobile device is activated responsive to the attachment of the modular server unit. In some embodiments, the method includes selecting a second modular server unit, detachable from and interfaced to a second mobile device of the group, as the group server. In some embodiments, the method includes receiving, by the modular server unit, data about one or more of the following: location, bearing, altitude, speed, and remaining battery capacity.

In some embodiments, the method includes processing, by the modular server unit, the received data by one of combining, relating, predicting or deducing new information from the received data, the consolidated data comprising the new information. In some embodiments, the method includes processing, by the modular server unit, previously received data stored on the module server unit with the received data to produce a journal of a trip. In some embodiments, the method includes comprises transmitting, by the modular server unit, the consolidated data via Internet protocol (IP) communications to an online repository. In some embodiments, the method includes detaching a plurality of modular server units from corresponding mobile devices in the group of mobile devices. In some embodiments, the method includes executing a nomination scheme to select one of the modular server units from the plurality of modular server units as the group server.

In some aspects, the present solution is directed to a system for establishing a group server for a group of mobile devices. The system includes a group of mobile devices. Each of the mobile devices includes a private mobile radio module to communicate with other mobile devices in the group. The system includes a modular server unit detachable from and interfaced to a mobile device of the group of mobile devices and comprising a private mobile radio. The modular server unit is activated as a group server for the group responsive to detaching the modular server unit from the mobile device and the private mobile radio module of the mobile device is deactivated responsive to activating the modular server unit. The modular server unit receives via the private mobile radio data from a plurality of the mobile devices of the group of mobile devices, processes the received data to consolidate the data; and transmits via the private mobile radio the consolidated data to each of the mobile devices of the group.

In some embodiments, the modular server unit sends a signal that the modular server unit will no longer act as the group server for the group. In some embodiments the modular server unit sends the signal responsive to attaching the modular server unit to the mobile device, the private mobile radio of the modular server unit deactivated upon attachment and the private mobile radio of the mobile device activated responsive to the attachment of the modular server unit. In some embodiments, a second modular server unit, detachable from and interfaced to a second mobile device of the group, is selected as the group server.

In some embodiments, the modular server unit receives data about one or more of the following: location, bearing, altitude, speed, and remaining battery capacity. In some embodiments, the modular server unit processes the received data by one of combining, relating, predicting or deducing new information from the received data, the consolidated data comprising the new information. In some embodiments, the modular server unit processes previously received data stored on the module server unit with the received data to produce a journal of a trip. In some embodiments, the modular server unit transmits the consolidated data via Internet protocol (IP) communications to an online repository. In some embodiments, a plurality of modular server units are detached from corresponding mobile devices in the group of mobile devices. In some embodiments, one of the modular server units or one of the mobile devices executes a nomination scheme to selects one of the modular server units from the plurality of modular server units as the group server.

BRIEF DESCRIPTION OF THE FIGURES

The foregoing and other objects, aspects, features, and advantages of the invention will become more apparent and better understood by referring to the following description taken in conjunction with the accompanying drawings, in which.

In the drawings, like reference numbers generally indicate identical, functionally similar, and/or structurally similar elements.

DETAILED DESCRIPTION

Figure 1A:
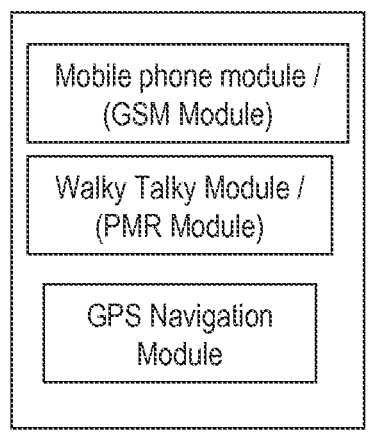
FIG. 1A is a block diagram of a multifunction mobile device, herein also referred to as the mobile device.

For purposes of reading the description of the various embodiments below, the following descriptions of the sections of the specification and their respective contents may be helpful:
- Section A describes hardware architecture of the multifunction mobile device;
- Section B describes software components of the multifunction mobile device; and
- Section C describes a modular and detachable group information server for providing services to a plurality of mobile devices.

A. Multifunction Device Hardware Architecture

Prior to discussing the specifics of embodiments of systems and methods of audio roaming via the multi-function mobile device, also referred to as the mobile device 100 or a device 100, it may be helpful to discuss the environments in which this device may be used. The mobile device may be used by any outdoor enthusiast embarking on a trip in an environment in which he or she would like to utilize a rugged mobile telephone for voice and emergency communication, a rugged GPS navigator for identifying location information and a rugged walky talky for off net group communication with other users in the area. The mobile device may be used in any outdoor setting, such as mountains, prairies, deserts, swamps, lakes, woods, jungles or in any uninhabited area. The device may also be used in any weather and by any group of users, individuals or groups, such as families and friends on a camping or a cross-country trip, skiers and snowboarders, motorcyclists and globetrotters. Mobile device may be used in a fishing trip, a hunting trip as well as in boating, sailing and river rafting trips, jungle expeditions and safaris. An outdoorsy person may use the mobile device for a piece of mind and security of knowing that in case of an emergency he or she may, if necessary, have an access to a telephone, a walky talky, a GPS navigation system device, a light source, a device that connects to the internet, a compass or a device that reveals locations of any other users or persons in the area, all provided by a single multipurpose, multifunction handheld device.

The mobile device may provide a user or a group of users located in a remote outdoor setting with a means to communicate with each other. This device may further provide the users with personal GPS navigation functions and ability to locate other members of the group, may enable data connectivity and access to various activity related applications and internet services. In an environment in which the users may not have access to cellular telephone or cellular data coverage, mobile device may provide the users with a means of communication via radio frequencies open for civilian radio communications, such as for example (private mobile radio) PMR 446 operating at around 446 MHz frequency. In some embodiments, radio communication may be implemented via military or government use designated radio frequency ranges. Implementing the communication via the radio band may enable the users to communicate with each other without incurring excessive charges, such as roaming charges, from the mobile telephone service providers.

Referring now to FIG. 1A, an embodiment of a block diagram of a multi-function mobile device 100 is illustrated. The mobile device 100, or the device 100, may three main modules, such as the mobile phone module, walky talky module and the GPS navigation module. The device 100 may also include a power button, a display screen and a multitude of other function buttons. Mobile device 100 may be enclosed within a casing or an enclosure which may comprise a hard and rugged material. Display screen may enable the user to user various features of the device and view a graphical user interface. Mobile device may include any features of a portable navigation assistant (PNA) or a portable navigation device (PND). Mobile device may include any functionality of a global positioning system (GPS) device providing location, positioning and directions functions and features to a user. Mobile device may also include any portable hand-held multi-way radio transceiver functionality, such as any functionality of a hand-held walky talky device for communicating via a radio band. Mobile device may further comprise any functionality of a smart phone enabling a user to access the internet, check, send and receive emails or use any other web-based functions.

The enclosure of mobile device 100 may comprise any hard and/or rugged material for protecting the device, including any type and form of a metal, plastic or rubber. The enclosure may include any material or any combination of materials to protect the device from external elements including water, rain, wind, pressure, temperature, tension or compression. The enclosure may provide protection to the hardware components within the device and protect the display screen from any outside elements. The enclosure may enable the device to function upon being dropped, scratched or used in any harsh or stressful environment. Mobile device enclosure may comprise mobile device logo and/or mobile device related information, such as a company name or address. Mobile device enclosure may be compliant with IP57 and MIL-STD 810F/516.6&522 standards and may also be waterproof, such as for up to 1 meter depth under water and for a duration of 30 minutes. The enclosure along with the remainder of the device may be designed to withstand about 8 kV of charge in air and about 4 kV of charge in contact without damage to mobile device 100. Display screen of the mobile device 100 may include any type and form of display as described below.

Mobile device 100 may include any number of selection points, or joysticks which may be used by the user to operate the device. In some embodiments, mobile device includes an on/off button, a volume button, a speaker phone button or a telephone button. Mobile device may include a button to switch between modes of communication, such as the communication via a radio frequency and a communication via a cellular telephone communication or an internet data communication. Any number of function buttons may be included, such as: a docking button, an enter button, a menu button, an escape button, an out button, a go to button, an in button, a navigation button, a search button and a mark button. Mobile device may include any button or a selection feature to enable selection of any functionality or feature of mobile device.

Still referring to FIG. 1A, embodiments of functionalities of the multifunction device may include any number of features useful for a group of enthusiasts in an outdoor environment. A mobile device 100 may combine and include all the functionalities of a cellular telephone, a walky talky device and a hand held GPS navigation device. Mobile device may include any hardware, software or a combination of hardware and software of a mobile telephone device and for implementing mobile telephone functions. Mobile device may also include any hardware, software or a combination of hardware and software of a private radio communication device, such as a walky talky device. In addition, mobile device may also include any hardware, software or a combination of hardware and software of a GPS navigation device. Mobile device may implement any of the functionalities or features of the cellular telephone, walky talky or a GPS navigation device on a single device, thus implementing all of these functionalities on hardware and software of a single device.

Figure 1B:
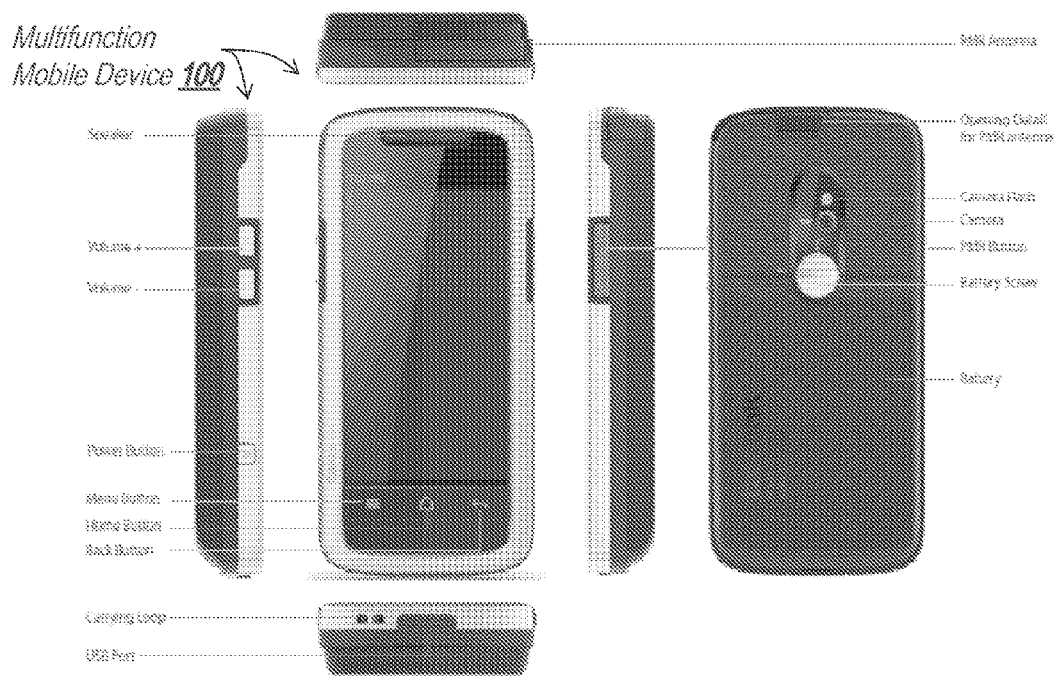
FIG. 1B is an embodiment of a design of the mobile device.
Figure 1C:
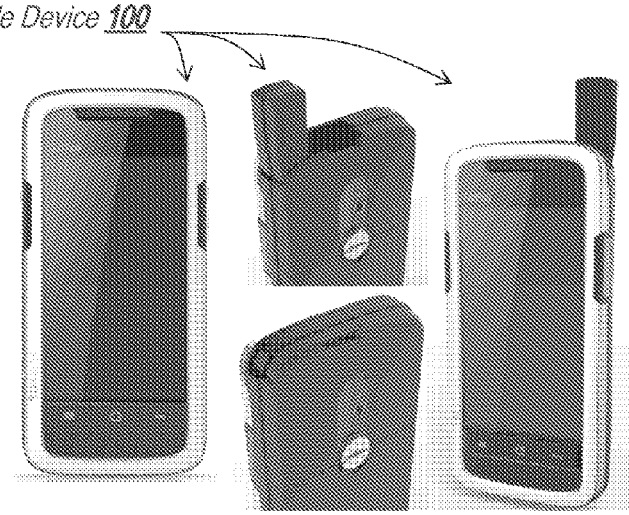
FIG. 1C is another embodiment of a design of the mobile device.

Referring now to FIGS. 1B and 1C, embodiments of an industrial design of a mobile device 100 are displayed. In FIG. 1B, the mobile device 100 may be designed to include functionalities of a smart phone, such as a smart phone utilizing Android operating system and software stack for mobile devices developed by Google Inc. In such embodiments, mobile device may include functionalities of an android smart phone in combination with functionalities of an outdoor navigation device and a walky talky device. Mobile device may comprise a speaker and a microphone for communication, one or more volume buttons, a power button, a menu button, a home button, a back up button and a PMR button. Mobile device may also include a carrying loop, a universal serial bus (USB) port, a PMR antenna along with an opening detail for the PMR antenna, a camera flash, a camera, a battery and a battery screw or mechanism for access. Mobile device may include a single antenna for all modules and communication protocols, including PMR, GSM and GPS modules and protocols or may include separate internal antennas for any of the modules.

Mobile device 100 may comprise overall length of anywhere between 10 and 200 mm, such as for example 10 mm, 20 mm, 40 mm, 80 mm, 90 mm, 100 mm, 110 mm, 120 mm 130 mm, 131.60 mm, 140 mm and 200 mm. Mobile device may comprise overall width of anywhere between 10 mm and 150 mm, such as for example 10 mm, 20 mm, 30 mm, 40 mm, 50 mm, 60 mm, 66.50 mm, 70 mm, 80 mm, 90 mm, 100 mm, 120 mm, 150 mm, 200 mm and 300 mm. Mobile device may comprise overall thickness of anywhere between 5 mm and 50 mm, such as for example 5 mm, 10 mm, 15 mm, 20 mm, 20.40 mm, 25 mm, 30 mm, 40 mm and 50 mm. Mobile device may comprise any weight between 50 grams and 500 grams, such as for example 50 grams, 100 grams, 150 grams, 200 grams, 230 grams, 250 grams, 300 grams, 400 grams, 500 grams, 600 grams, 800 grams and 1 kilogram. In some embodiments, mobile device includes dimensions of about 13 centimeters in height, about 7.5 centimeters in width and about 3 centimeters in depth and weighs about 300 grams with battery.

Mobile device 100 may include a resistive touch screen which may enable the user to communicate with the device by touching the features, buttons or options displayed on the screen. The device may also include function keys, such as the home, the menu and back keys of an Android mobile operating system by Google Inc. The volume keys may be used to adjust ringer, cellular telephone calls, such as GSM calls, radio band call, such as the PMR calls when mobile device is used as a walk talky, or even to adjust the volume of media or internet applications, such as audio/video files being displayed on the device. The power key may be used to power up the device and awake the device from the sleep mode. A dedicated PMR key may be used to switch to and from the radio frequency communication mode, or the walky talky mode, which may also be referred to as the PMR mode. Mobile device may include an aluminum frame as well as hard and soft plastic material along with a bumper, a retractable PMR antenna and a cap for the USB port.

Robustness of the mobile device may be according to any international protection rating, including IP×5 or IP×7. Mobile device may be designed to withstand extreme conditions including exposure to water, dust, extreme temperatures, drops, bending, twisting and vibration. Mobile device may be robust to satisfy IP×5 international protection rating or IP×7 international protection rating for protection against outside elements including water, temperature, dust, drops or shocks. In one embodiment, mobile device is water resistant in accordance with IP×5 and IP×7 standards. In a further embodiment, mobile device is dust resistant according to IP×5 standard and/or IP×7 standard. Mobile device may be resistant to a drop test on a concrete floor from a height of 1, 1.5 or 2 meters. Mobile device may also be resistant to stress induced by a barrel testing in which the device is tumbled from 0.5 meters within a turning metal barrel.

Referring to FIG. 1C, an embodiment of a mobile device with a PMR antenna pulled out is displayed. As the device may be switched between the cellular telephone mode and the walky talky or the PMR usage mode, the user may pull out the PMR antenna from the device to improve the reception of the mobile device during the PMR usage.

Figure 1D:
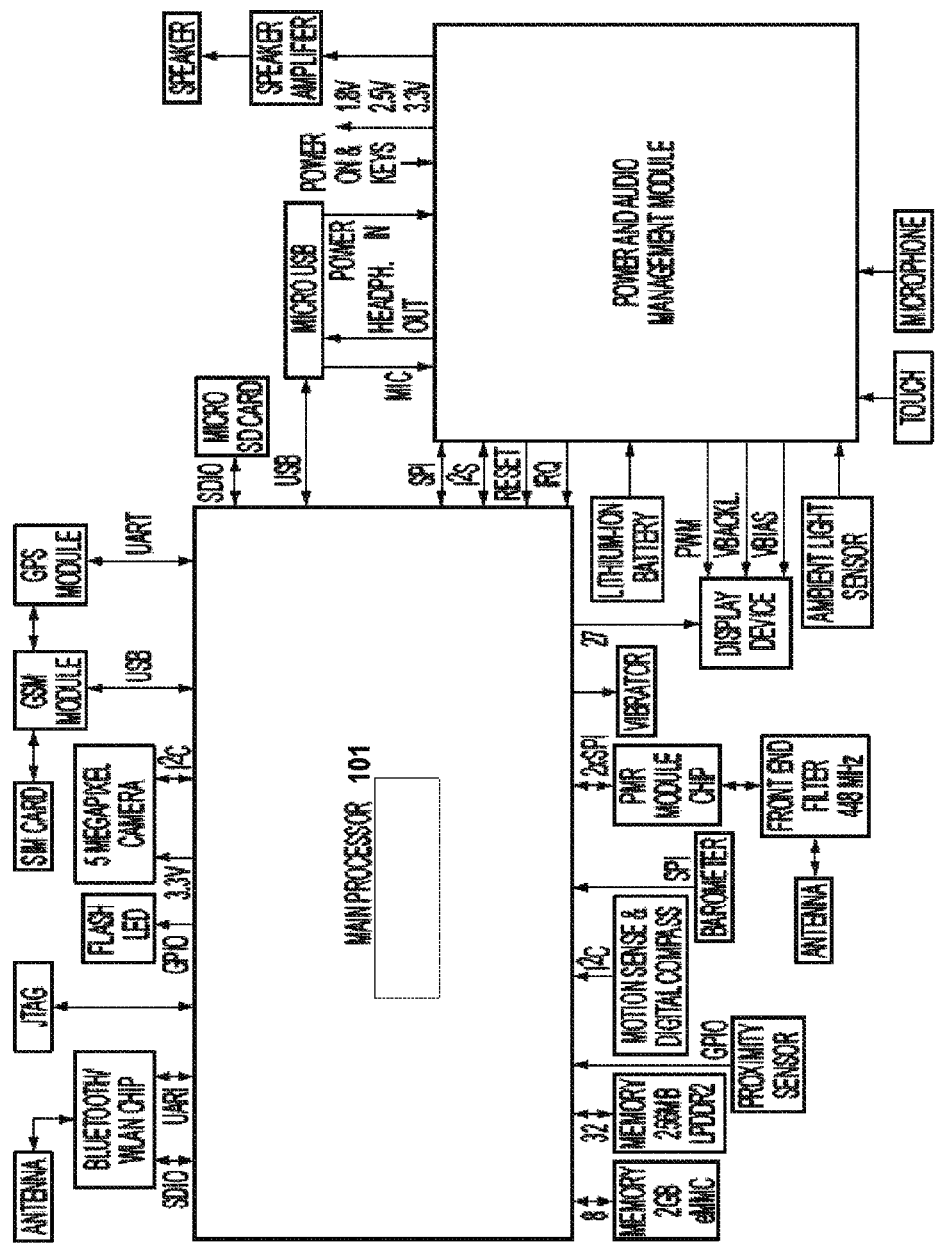
FIG. 1D is a block diagram of the hardware components of the mobile device.

Referring now to FIG. 1D, an embodiment of a mobile device hardware system is illustrated. Mobile device 100 system may include any number of integrated circuits, processors, memory, logic and computing units. Device 100 may include a central processing unit, also referred to as processor 101. The processor may serve as the main processor for the device and may be integrated with or in communication with any number of other units, functions, devices or modules. Mobile device 100 may also include a module for Global System for Mobile (GSM) and/or General Packet Radio Service (GPRS) communication. Mobile device 100 may further include a module for PMR communication, such as PMR chipset for radio wave communication, such as a walky talky communication. Mobile device 100 may further include a GPS module for GPS navigation and location. Mobile device 100 may further include any number of memory devices, such as a Micro Secure Digital (MicroSD) card interface as well as a Subscriber Identity Module (SIM) card interface, a MicroUSB connector, and memory such as low-power 256 mega byte low power DDR2 memory and 2 giga byte multimedia card (MMC). Power supply module may include a battery, such as Li Ion battery for 2700 mAh and power management circuitry for controlling or managing power, such as a power and audio management integrated circuit (IC). A visual display device, also referred to as display device 124, and may include a touch screen and one or more keys/buttons 126. A power supply, also referred to as power supply 116, may include power management circuitry, a Lithium Ion battery and battery control features. Memory devices may include cache memory interfaced via a bus which may have a faster response time than main memory.

In addition, mobile device 100 may also include a 3.5 inch display with resistive Touch Panel which may be used as display 124 for the device. A combined BT/WLAN chip for Bluetooth (BT) and Wireless Local Area Network (WLAN) communication may be provided as a Bluetooth and WLAN module. A JTAG standard text access port may be included into mobile device 100 for testing purposes. A vibrator module may also be integrated to enable the mobile device to be used on vibration mode similar to the vibration module of a mobile phone activated by a received communication or a phone call. A 5 Mega Pixel (MP) camera with autofocus and a flash light LED may be integrated into the system as well. The camera may include a digital zoom, such as a 3×, 5× or 10× digital zoom. Mobile device 100 may also include modules for a G-Sensor, an electronic compass, an electronic barometer, a barometric altimeter, a proximity sensor and an ambient light sensor. A speaker, such as a loud speaker may be interfaced with an amplifier to provide sufficient dB rating to withstand any loud outdoor environment and enable a user to communicate via a loudspeaker a distance of about 10-100 centimeters from the device.

Still referring to FIG. 1D in a greater detail, the main processor 101, or the central processing unit (CPU) may comprise any hardware or logic circuitry for processing instructions, commands, data, applications or any functionality of the mobile device 100. CPU 101 may include any logic or functionality that responds to and processes instructions fetched from the main memory unit 122 or any instructions pertaining to any functions or user applications. The central processing unit may be provided by a microprocessor. Mobile device 100 may include any mobile telephone, smart phone or any mobile device processor or a CPU that may be used on a mobile device or is capable of operating as described herein.

Memory of the device may include one or more chips capable of storing data. Memory, which may also be referred to as the main memory unit 122, may include static memory and/or dynamic memory. Main memory unit 122 may include functionality to allow any storage location to be directly accessed by the microprocessor 101. Main memory unit 122 may include Read Only Memory (ROM), Erasable Programmable ROM (EPROM), Flash memory (NOR flash as well as NAND flash memory), Electrically Erasable Programmable Read Only Memory (EEPROM). Memory unit 112 may include Static Random Access Memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ES-DRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. The processor 101 communicates with main memory 122 via a system bus. Main Memory unit 122 may also include interface for external, user inserted memory, such as SD-Micro memory card which may be used by the user to add additional memory to the device. In some embodiments, Mobile device 100 supports Micro-SD cards of at least 8 GB in memory.

Memory unit may include memory designated for storing operating system functions, software, data, applications and functions. Operating system may include any type and form of mobile device operating system such as SmartPhone Operating System by Android Inc, Symbian operating system by Symbian Ltd., Microsoft Windows Mobile operating system by Microsoft Corporation, Moblin mobile Linux based open source operating system or any other operating system capable of performing functions described herein. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Software deployed on storage device may include any user selected or downloaded software as well as software or functions implemented by the operating system or mobile device specific functions or applications. Applications 120 may also comprise mobile device specific applications and functions as well as user specific applications or functions described herein.

Power supply module, also referred to as power supply 116, may include a battery and any logic, hardware and software for energy management of the device. The power supply 116 may also include functionality for charging or powering the battery. The power supply may include energy management functionality to adjust the power output so that mobile device's function is optimized with respect to the battery life. For example, power supply 116 may provide the USB ports with about 5V, even in the off state. The power supply may have a limit on the amount of current that may drawn at the same time, such as a limit of about 500 mA. Power supply 116 may comprise any type and form of a battery such as a lithium ion battery, nickel-cadmium battery, silver oxide battery or any other type of a device for storing electrical energy and providing such stored energy to a mobile device, such as the mobile device 100. The battery may act as a power supply for all of the mobile device modules, including the GSM module, PMR module or GPS module. The battery may be charged via a charging or communication interface, such as a USB interface, and may be charged with a charger, such as a standard USB charger. USB interface may include switchable 4-wire universal asynchronous receiver/transmitter (UART) across the USB interface. USB interface may also act as a connector, such as a 10 pin USB Micro-AB socket or cradle connector. For example, UART may be accessible via USB interface. In one embodiment, external rechargeable batteries, such as AA or AAA batteries may be used to power mobile device 100. External batteries along with any additional chargers or mounts may be provided as an additional accessory to the mobile device 100. The power supply 116 may include functionality for power management to ensure that mobile device 100 may have a stand-by time of about 72 hours and about 8 hours of combined usage time. The combined usage time may include about 30 minutes of GSM talk, 30 minutes of PMR talk, 8 hours of GPS turned on and every five minutes group status update in terms of about 20 kb of data via PMR or GSM.

Power Management circuits or functions may provide charging control, temperature control and power supply detection. Safety relevant functions regarding charging protection, temperature control must work independent of the processor or the operating system. In case that the device may not be charged due to the battery's temperature or limitations in the power supply, the device shall be entirely supplied from the power supply, such as the battery may not be drained. Any power management related parameters may be periodically updated to the API at a rate of no more than 10 s. Changes to the external power supply, such as disconnection of a host PC and connection of a charger may be dynamically detected in every power mode, at an update rate of no less than 5 s. When the external charger is connected, the charger may provide to mobile device battery 5V at 1 A. The device may be charged from 0% (i.e. below operation threshold) to 100% within 2.5 hours while it is suspended or off and within 3.0 hours, while the device is operated. When the device is connected to a host PC, there may be no charging time requirements if the device is running If the device is switched off or is in a suspend mode, the battery shall be charged within max. 3.0 hours and the device shall draw no more than 500 mA from the host PC.

Device power management circuitry may include functionality to enable power-up of the device only if the integrity of the system supply voltages are ensured. This may allow for proper selection of a battery voltage threshold used to make the decision whether or not to allow a power-up sequence. In case of an attached external power source, the power management architecture may allow direct supply of the device from that external power source and may support immediate power-up, independent of the battery charging level only, if memory and system integrity can be guaranteed even throughout a sudden power loss. The power management architecture may only allow a device boot-up process if the remaining battery power allows completing a boot-up sequence. In particular, any sequence of cyclic power-up attempts may be avoided. For example, a battery power may allow a boot-up of the device. As the boot-up process starts, the battery voltage may drop below operation level due to the increased operation current, which may cause the device to shut down during boot-up. After shut-down the battery level rises again above operation boot-up threshold and the procedure would start over. This behavior may be avoided via the above mentioned power management function. The operating system may monitor the charging status of the device. Charging of the battery may be limited to a temperature range in order to ensure safe charging and the safety of the device. As such, overcharging protection function may be provided to interrupt the charging process should the battery voltage exceed the voltage limit or should the charging time exceed a time-out value defined in the charging circuitry. Battery power management may include the functions for resetting mobile device 100. A soft reset may reset the processor of mobile device in which data and memory integrity are ensured. Memory caches may be cleared and drivers may be stopped as well as memory controllers. Hardware reset may be done to temporarily disconnect power from all circuitry of the device. A hard reset may be done to bring mobile device settings back to the factory settings.

Display screen or display device 124 may include any type and form of a display device. Display device 124 may be a liquid crystal display (LCD), a light emitting diode (LED) display, an electroluminescent display (ELD), a thin film transistor (TFT) display, an organic light emitting diode (OLED) display, a quantum dot light emitting diode display (QDLED) or a nano-crystal display or any other type and form of display which may be used on the device. Mobile device display may comprise a touch screen that may detect the presence of a location of a touch by a user, thus enabling the user to select features, buttons or points on the display by touching a given section of the display. Display may include any size or resolution, such as HVGA resolution of about 320 by 480 pixels or QVGA resolution of about 320 by 240 pixels. In one embodiment, display 124 includes a trans-flective TFT HVGA display with a contrast ratio of about 300:1, luminance of about 350 cd/m2 and color depth of 16 bits per pixel (bpp). The display may display the user's location, location of other users and a list of users. The display may also display coordinates, direction or a position of the user's location, coordinates, direction or a position of locations of other users or any of the GPS or navigation related functions. The display screen may illustrate the time via a clock, battery related information or any other device related information. The display may provide the user with the graphical user interface as well as enable the user to communicate with the device and to select various functions of the device. Display device may also include a backlight which may be dimmable from 0%-100% in 16 steps of %6.25 each via CPU/Application.

Interfaces for communicating with external network devices may be collectively termed the network interfaces of mobile device. Network interfaces may include any hardware, software or drivers for enabling the mobile device to communicate with a network or another computing device. Network interfaces may also include hardware, software or logic for enabling mobile device to communicate with an external device via a wired or wireless connection, including a USB connection, Bluetooth, WLAN, PMR, GSM/GPRS, GPS or any other communication technique. In some embodiments, network interfaces enable the mobile device to communicate via worldwide interoperability for microwave media (WiMAX) communication protocol. Network interfaces may enable mobile device to send and receive communication via any frequency range and via any communication protocol including: high speed packet access (HSPA), high speed downlink packet access (HSDPA), high speed uplink packet access (HSUPA), evolved high speed packet access (HSPA+) or any other mobile telephone protocol capable of operating as described herein. Furthermore, the network interface may include functionality to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface may comprise or provide functionality for a built-in network adapter, network interface card, PCMCIA network card, card bus network adapter, wireless network adapter, USB network adapter, USB socket, a modem or any other device suitable for interfacing the computing device 100 to any type of network capable of communication and performing the operations described herein. Network interface may include a USB interface for communication with external devices or for charging mobile device battery. USB interface data lines may be switchable between USB mode to support the hardware flow control signals of a 4-wire UART interface including request-to-send (RTS) and clear-to send (CTS) functionality. Switching may be implemented upon detection of a connected device via a pin of a Micro USB socket.

Network interface may include functionality for detecting any external devices being connected to mobile device 100. Network interface may include functionality to respond to the device and establish communication. In one embodiment, network interface includes a USB interface that is designed according to the specifications of the USB Organization. In such an embodiment, when a device signals its presence to a host device by pulling one of the data lines high, the device may record and respond to communication requests of the host. If the device cannot respond to host PC communication requests in time, e.g. during the cold boot process, the initial signaling to the host device must be delayed until the device is ready to respond to the host communication requests. When the device is being suspended while it is connected to a host PC, the device may execute a virtual disconnect, in order to inform the host PC that the device is not able to respond. After resuming from suspend, the device shall inform the host device that the device is available again.

The speaker may be a 2 Watt mono speaker of about 36 mm membrane diameter. Mobile device 100 may further include or be configured with an earpiece, such as a standard earpiece for mobile telephone communication. The speaker may be interfaced with the housing to enable stability and acoustics for efficient output. The frequency range of the speaker may be 500-10000 Hz at −5dB range. Sound pressure level may be 86 dB measured at 1m with less than 10% total harmonic distortion across a frequency band of at least 1 kHz in the frequency range between 2 kHz and 4 kHz.

Mobile device may include a microphone for communication in an outdoor and mobile environment. The microphone may be integrated for voice recognition and may be sampled with 16 kHz signal in 16 bit quality of voice recognition. The microphone may be separated and isolated in a rubber enclosure to decouple any low frequency interference and be separated from motherboard electronics, vibrations or noise.

A mobile communication module of the mobile device 100, which may also be referred to as the GSM module, may include any hardware and software to support any standard 2 G, 2.5 G and/or 3 G communication via GSM, GPRS and/or EDGE protocols. The mobile communication or the GSM module may include customized logic and/or functions. The mobile communication module may also support communication via code division multiple access (CDMA) or time division multiple access (TDMA). The mobile communication module, herein referred to as the GSM module, may include functionality to support high speed downlink packet access (HSDPA) for 3 G communication. GSM module may include adaptive multi rate (AMR-NB) audio codec and multi slot class (MSC) with at least 4 TS downlink and 2TS uplink Pv4 support. GSM module may include functionality to support WiMAX communication. GSM module may also include functionality for enabling the mobile device 100 to communicate with a server, such as the server of a mobile network provider, a proxy server, a cache server or any server or a network device providing access to the internet. In some embodiments, GSM module may comprise functionality to act as a server communicating with other mobile devices 100 via a transport layer protocol, such as the internet protocol (IP).

GPS module may include any hardware and software for location navigation and detection. GPS module may include a receiver which may include wide area augmentation system (WAAS). The GPS module may be differential-ready and may include 12 parallel channels. GPS module may include a power input: 7.2.1, antenna: internal and update rate of 1/second which may be continuously updated. GPS module may include GPS radio frequency (RF) of about 161 dBm sensitivity, which may be front end filtered and provide location accuracy of about 1 meter from the target location. GPS module may also include differential global positioning system capacity along with WAAS functionality. GPS module may be accurate to about 20 meters, 10 meters, 5 meters, 3 meters, 2 meters or 1 meter with about 95% variation with or without any DGPS corrections. GPS module may include velocity accuracy of 0.1 meter/sec at steady state and may have acquisition time of anywhere between 1 second and 60 seconds, such as 3 seconds, 32 seconds and 39 seconds. GPS module may include functionality to provide accuracy of location detection of about 1 meter or in minimum comparable equal or better than best in class competitor device, such as for example navigation system Garmin 550T.

For optimum GPS reception special care may be taken to minimize any unwanted radiation from the device (self interference) to a level which will not degrade the GPS sensitivity, compared to a reference receiver of the same model and make as utilized in the device. Appropriate mass production stable shielding technologies and filtering methods may be applied to the design to ensure that connecting the device to a holder of the user will not degrade GPS performance. In some embodiments, GPS patch-Antenna may include a size of about 25 mm by 25 mm by 2 mm. If GPS receiver works as stand-alone solution (non host based), National Marine Electronics Association (NMEA) signal output may be sent to serial port of CPU. NMEA may include electronic and data specification for communication between GPS devices. GPS module performance in terms of Time To First Fix (TTFF) may be less than 60 seconds for a cold start and less then 5 seconds for a hot start using Mobile Navigator (MN7) application. The ratio of the power level of the signal to the noise conducted or radiated noise generated by the mobile device may be less than 1.0 dB, while device is playing a video (dynamic video content visible on screen) located on the removable memory device and also located on internal flash. The front end of the GPS receiver may include filtering which reduces possible interference from a SIM module or GPRS module which may be attached to the rear docking interface to a level that does not lead to noticeable performance degradation of the GPS receiver, both during acquisition phase as well as during tracking phase.

PMR module may include hardware and software for radio frequency communication. PMR module may include any functionality for implementing two way communication via radio waves, such as walky talky or PMR communication. PMR interface may include hardware or logic for implementing and using two-way radio communication via any frequency range. PMR interface may further comprise an antenna for the PMR communication. PMR interface may include functionality to transmit and receive information at any frequency in the radio frequency range, such as between 30 kHz and 300 GHz. In some embodiments, PMR interface may include functionality to transmit and receive information at frequencies between 1 MHz and 1 GHz, such as for example at any communication channel between 446.00 and 446.20 MHz of the European Private Mobile Radio (PMR) 446 radio frequency range, at any channel between 476.425 and 477.400 MHz of Australian Ultra High Frequency (UHF) Citizen's Band (CB) radio frequency range, at any channel between 462.550 and 467.725 of the General Mobile Radio Service frequency range for the FM UHF radio service in the USA or any other radio frequency range that may be used by a walky talky, a two way radio or any other radio frequency range wireless communication device.

PMR interface may include any logic, hardware, software or firmware to provide the functionality for implementing PMR radio communication and/or Bluetooth wireless communication. Bluetooth functionality may also include non-host CPU based advanced error reduction/noise reduction (AEC/NR) features. PMR module may include any number of channels between 1 and 100, such as for example 8 channels. PMR module may include functionality to communicate via any UHF frequency range, such as at around 446 MHz and may include logic and functionality for communicating via PMR 446. PMR module may include the functionality for squelching unrelated radio communication, such as continuous tone-coded squelch system (CTCSS) codes. In some embodiments, PMR module includes 38 CTCSS codes. PMR module may have a range of anywhere up to 100 km, such as 21 km or 5 km. PMR module may have radio power output of RMR 0.5 W and may have external or internal antenna. PMR module may include functionality for transmitting voice as well as data. Bluetooth functionality may support Bluetooth 2.0 High Speed as well as lower speed communication in addition to supporting WLAN communication. In some embodiments, PMR module and interface include functionality for supporting WiMAX communication of the mobile device with other devices.

Mobile device 100 may operate at any temperature, such as between −10 Celsius and 60 Celsius and may be stored at any temperature between −20 Celsius and 80 Celsius. Mobile device 100 may support GSM/EDGE bands at any number of frequencies, including 850 MHz, 900 MHz, 1800 MHz, 1900 MHz and 2100 MHz. Mobile device may enable communication via PMR radio, a two-way radio or walky talky device, via GMS or WiMAX for any distance range, such as for example 1 km, 2 km, 3 km, 4 km, 5 km, 6 km, 7 km, 8 km, 9 km, 10 km, 11 km, 12 km, 15 km, 20 km, 25 km, 30 km, 50 km, 75 km, 100 km, 150 km, 200 km, 500 km and 1000 km.

PMR application may enable the user to communicate to other standard PMR446 Walky Talkies. In some instances, PMR application may enable the user to communicate to any other two way radio or a walky talky regardless of the frequency or channel. In particular the application provides guidance to adjust the channels and other PMR specific settings (like Voice Activation, Voice Scrambling and Roger Beep).

Mobile device 100 may include sensors, indicators, accelerometers, light emitting diodes or devices (LEDs) or buttons. Air pressure sensor may be used as a barometric sensor or barometric altimeter. Barometric altimeter sensor or barometer sensor may comprise any hardware, software or a combination of hardware and software for measuring the pressure of the ambient air and/or determining altitude or height above the sea level. Barometer may comprise functions, algorithms, executables or programs. Barometer may include functionality for measuring air pressure as well as algorithm for calibrating and adjusting the readings for temperature effects.

An accelerometer may be any device measuring acceleration of the device. Accelerometer may be used for display rotation as well as for games. Hall-effect sensor 3-axis may be used for electronic compass. Proximity sensor or ambient light sensor may be used for control touch and display brightness adjustments. Proximity sensor may be used to recognize a user's hand approaching mobile device 100. The range of the sensor may be between 1 and 20 centimeters from the device. The measured distance may be reported via 4 bit linear value to an application programming interface (API). LED flashlight may be of any power and may have any luminescence range of a standard outdoor flashlight, such as between 10 and 100 lumens. Mobile device may include indicators, such as LED indicators which may indicate power state or charging. These indicators may have luminance within 10% of each other, so that they appear even in intensity. Buttons, such as power button may be designed to require a specific amount of force in order to turn on or off the device, to avoid any accidental triggering. In some embodiments, power button may require between 2 and 2.5 N of force, such as 2.2 N, in order to turn on or off the device.

Functionality for minimizing interferences may be provided for speakers and/or microphones in order to improve clarity and efficiency. A high pass filter may be provided having characteristics of electrical audio path such that audio signals below about 300 Hz do not cause strong audible distortions at low. Furthermore, certain properties of the speaker frequency response may require manipulation. The platform may offer means to attenuate those frequencies with minimum of about 12 dB/octave below the (adjustable) cut-off frequency, as well as at least three configurable bandpass or band reject filters, e.g. by means of a codec with equalizer functionality. Filter settings may be made accessible to the customer via API, for means of audio tuning The hardware and the API may support at least volume settings in steps of 1 unit between 0 (mute) and 100 (Maximum volume setting). The resulting audio volume may be monotonically increasing with increasing steps. The linearization of the volume steps may be done as part of the navigation application by means of a mapping table, which associates each of the 10 volume steps in the application to one of the 101 volume steps in the audio driver.

The device shall support full-duplex handsfree telephony. In order to achieve excellent handsfree audio quality the device shall include echo cancellation and noise reduction techniques. The speaker volume during handsfree conversation may allow conversation at vehicle speeds of 130 km/h in a medium class car, such as a VW Golf 4 on a dry road. In this scenario, the far end party may not hear significant audio artifacts while the other party talks. Besides measures mentioned under paragraphs "Audio input" and "Audio output", the distance between speaker and microphone inside the housing may be maximized. This shall minimize acoustic coupling between speaker and microphone through the housing volume. The device may include mechanical measures to ensure no audible variations in echo cancellation performance over mass production, e.g. airtight sealing of speaker back volume and sealing of speaker/microphone front against housing to control audio leakage between microphone and speaker. Furthermore, the echo cancellation method and/or the audio attenuation between speaker and microphone may be powerful and precise enough to suppress audible feedback and/or audible artifacts.

B. Software Platform

Figure 2A:
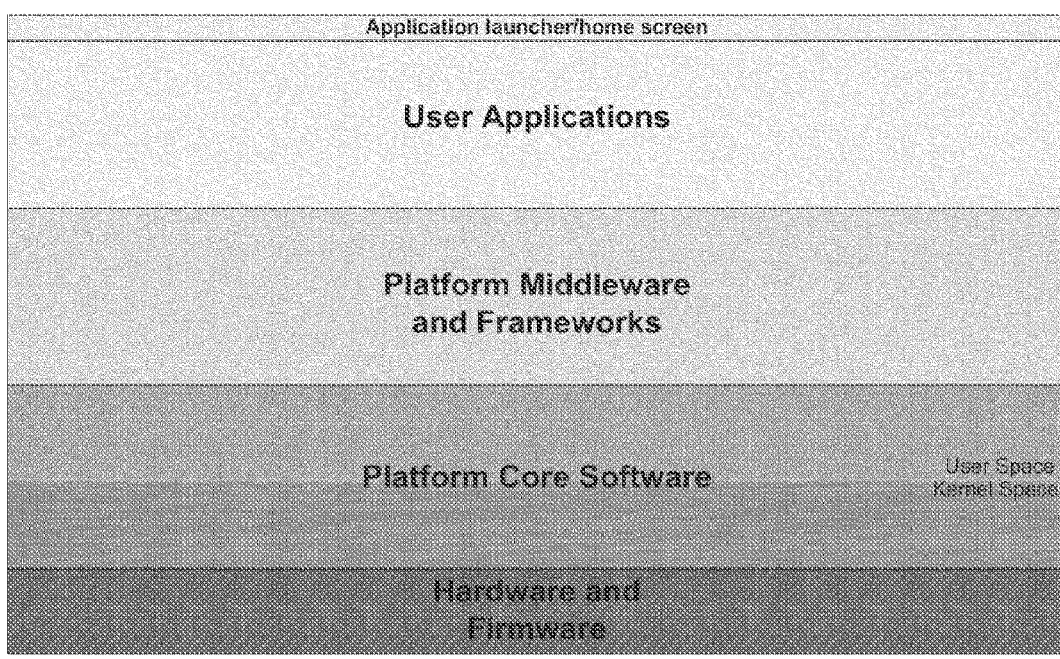
FIG. 2A is a block diagram of an embodiment of a firmware/software platform of the mobile device.

Referring now to FIG. 2A, an abstract overview of a mobile device platform architecture based on a modular operating system is illustrated. The operating system may include any type of mobile operating system, such as a SmartPhone Mobile Operating System by Android Inc. The system architecture may support multitasking applications and services environment. From a broad perspective, the mobile device may include hardware components as described above in connection with FIGS. 1A-1E. The hardware devices may be controlled by fixed firmware programs and data. Firmware programs and functions may include programs, executables or functions which manager and run operations of the hardware enabling the hardware to perform the given functions. Platform core software may execute based on the hardware and firmware and may be divided between the kernel space and user space. Platform middleware and frameworks may operate on top of the platform core software. User applications and application launcher or home screen may execute on the top layers and utilize any of the middleware, frameworks and the platform core software.

Figure 2B:
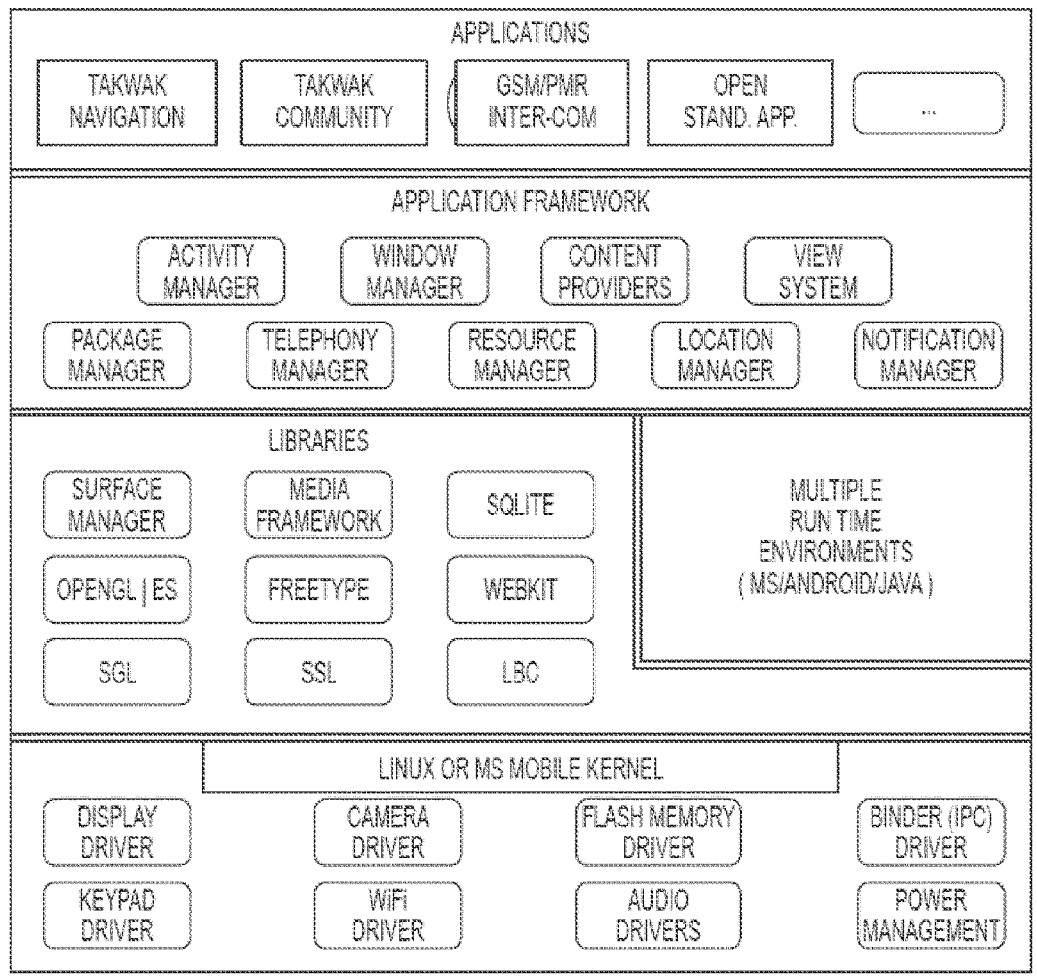
FIG. 2B is a block diagram of another embodiment the firmware/software platform.

Referring now to FIG. 2B, an embodiment of mobile device 100 platform architecture is illustrated. At the lower level Linux or Microsoft Mobile Kernel may host a number of drivers for controlling hardware components or functions. Drivers which may run within the mobile kernel may include: a display driver, a camera driver a flash memory driver a binder (PC) driver, a keypad driver, a WiFi driver, one or more audio drivers and a power management driver. There may be multiple run-time environments operating, such as Microsoft, Android or Java environments. Libraries may include surface manager, media framework, an embedded relational database management system, such as SQlite, a graphics library, such as OpenGL, a font rasterization engine, such as FreeType, a layout engine for web browser to render pages, such as a WebKit, a 3D library for the OpenGL, such as SGL, and a C language library, such as Libc. Application framework may provide framework for running any range of applications, such as: Activity Manager application, Window Manager application, Content Providers application, View System application, Package Manager application, Telephony Manager application, Resource Manager application, Location Manager application and Notification Manager application. Applications, such as Mobile device Navigation, Mobile device Community, GSM/PMR Inter-Com and Open Stand Application may operate on top of the Application Framework.

The platform may also include any number of codecs, such as media codecs, such as AMR-NB audio codec for real-time encoding/decoding, streaming, file format, PCM audio codec for playing and recording, MIDI audio codec, MP3 audio codec, JPEG image codec and MPEG2 video codec. In addition, mobile device may also include any number of other codecs for displaying graphics, audio or video.

Applications may be preinstalled on mobile device 100. Applications may include mobile device settings application, telephone call log application, contacts application, camera application, messaging application, alarm clock application, web browser application, calculator application, music application, calendar application and maps application. In some embodiments, third party applications may be used or installed on mobile device, such as applications for turn by turn navigation for roads and streets, geo-caching applications, such as games, sun and moon information applications, low and high tide information applications, area calculations and others. The Software Application platform and the user interface (UI) may provide access to a community application market to download further applications or to get access to new services. In some embodiments, to enable such access, the device may be binary compatible with other Android Devices. The device with all applications loaded, including the core, mobile device and third party applications may pass the Android Compatibility Test Suite (CTS) as defined in the Android Compatibility website.

On top of the "generic" open OS and standard Software Application/Feature packages which may be able to be used without having the mobile device specific software features and applications implemented/embedded, all other specific software functionality may be implemented by mobile device. Such mobile device specific applications may include: Group Communication application, Group Navigation application and the applications for the use of mobile device as a standard PMR walky talky as well as transmission of data via PMR module.

Figure 2C:
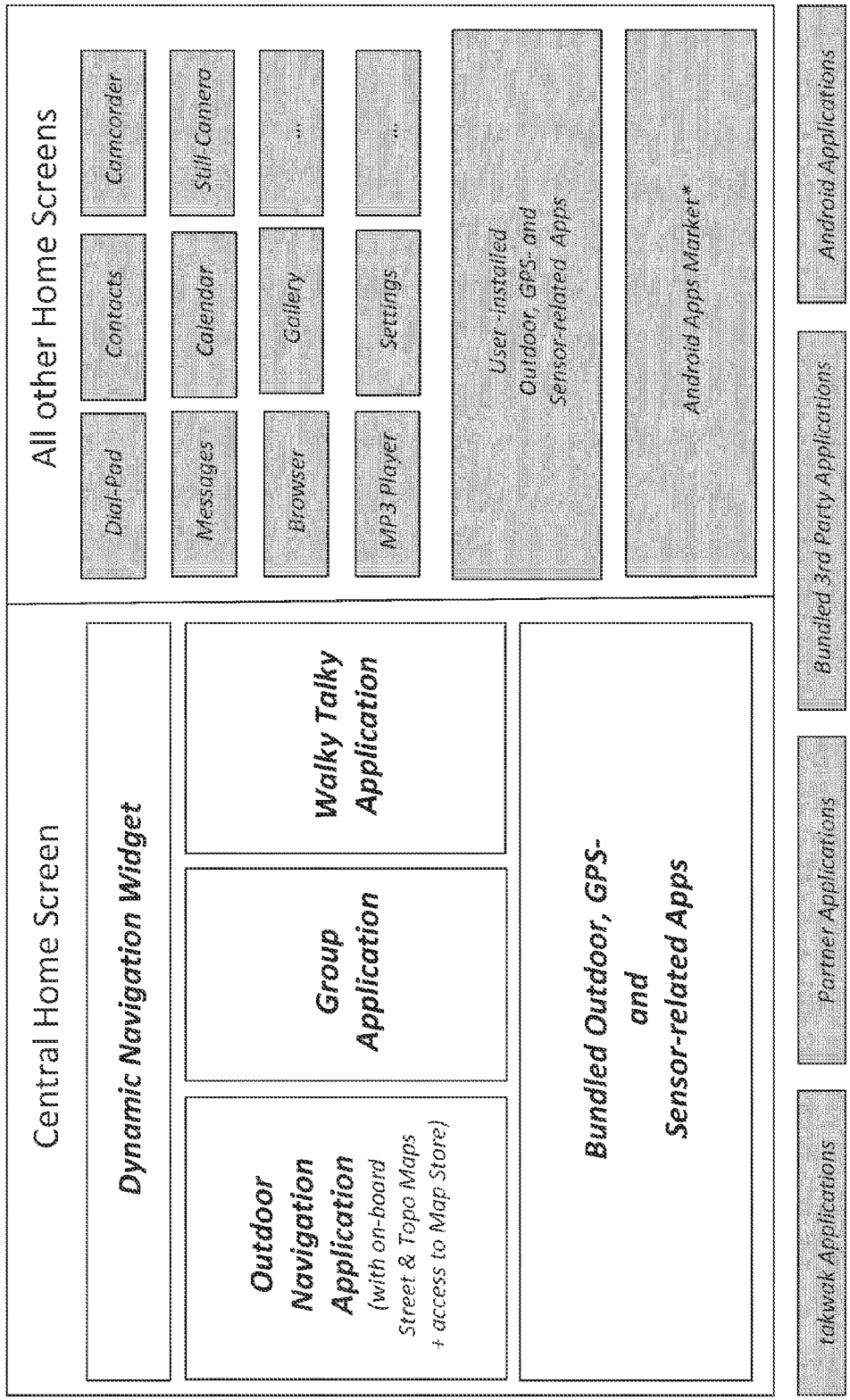
FIG. 2C is a block diagram of an embodiment mobile device applications.
Figure 2D:
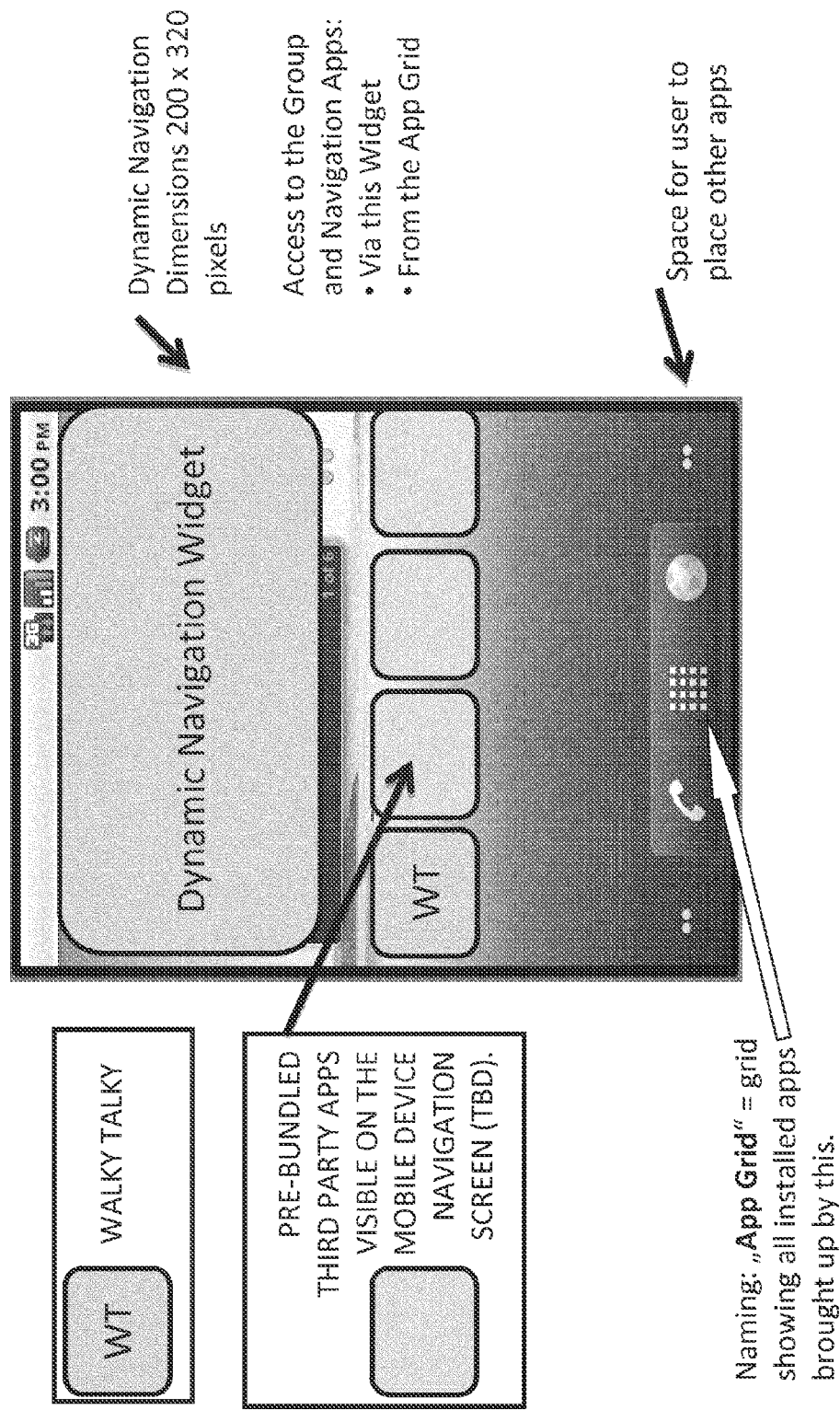
FIG. 2D is an embodiment of displayed mobile device applications.

Referring now to FIG. 2C, an embodiment of mobile device applications along with their home screens is illustrated. In brief overview, a central home screen may include a dynamic navigation widget, an outdoor navigation application, a group application, a walky talky application and a bundled outdoor GPS and sensor related applications. Other home screens may comprise applications such as dialpad, contacts, camcorder, messages, calendar, still-camera, a web browser, gallery, mp3 player, settings or any other additional applications. User-installed outdoor, GPS and sensor related applications and Android market applications may also be installed. In addition, device may further include mobile device applications, partner applications, bundled 3$^{rd}$ party applications and Android applications.

In further overview of FIG. 2C, dynamic navigation widget may include functions, algorithms, programs or interface for navigating through the applications or interfaces of the mobile device. Dynamic navigation widget may include a user interface or any graphical representation of the mobile device functions. Dynamic navigation widget may include functionality to enable a user to interface with the device and scroll through the screens of the device to select the applications or features of interest. Dynamic navigation widget may include links or triggers to functions the user may select. The functions selected may be any functions on the mobile device 100.

Dynamic Navigation Widget may be a widget and may be positioned on the central home screen of the mobile device and it may display most updated or actual status information from the Outdoor Navigation and Group Applications. The information displayed within the Dynamic Navigation Widget may depend on the current usage mode (such as, navigating alone or in a group), the Outdoor Navigation operation in progress (such as, recording a track, navigating to a target) and the group navigation mode selected (such as, seek member, follow me, direct all).

Outdoor navigation application may include functions, programs, algorithms and interface for using and displaying GPS navigation. Outdoor navigation application may include GPS navigation features and functions and may operate using the GPS module and its functionalities. Outdoor navigation application may include libraries of maps, coordinates and sites information. Street and topographic maps may be stored in memory and additional maps may be purchased through online stores for mobile device applications. Outdoor navigation application may include functionality and features to inform the user of the user's present location via coordinates. In addition, the application may provide the user with information regarding the user's altitude. Outdoor navigation information may further include functions for monitoring and updating weather information and weather forecast. Outdoor navigation information may enable the user to track coordinates or movements of other mobile device users, such as for example the members of the group. Using this application, the user may monitor locations and movements of other users or group members in the area.

The Outdoor Navigation Application may include any functionality of the Scout application for iPhone made by MagicMaps, with the notable addition that the Open Street Map (OSM) base map data are stored onboard the device. Maps User may select between Open Street Map (OSM) and topographical maps. Maps may be stored locally on the device and may be available regardless of connectivity. User can install/de-install hundreds of OSM regions for the whole world at will (OSM map material is free of charge). User may get one free topo map from MagicMaps and can buy more on demand. Purchasable topo maps may cover a region of any size, such as for example 200 kilometers squared. Outdoor navigation to a target may be supported by graphical instructions or spoken instructions. A user can customize the displayed data such as speed, distance, average speed using a Tacho functionality. The user may track himself (track is stored in tours). The user can download tours from others (commercial or community content) using Tours functionality. Tours can be rated and provided with further attributes (suited for, scenery, etc).

Group application may include functions, programs, algorithms and interface for providing means for monitoring, tracking and maintaining contact with other members of the group. Should the user using mobile device be a member of a group of mobile device users in the surrounding area, the user may use the group application to maintain contact with the members of the group, to gather information about their presence and movements and to share information with other members. Group application enables the users to freely roam an area, such as woods or a jungle, being able to stay in contact with any other member or with the group as a whole. Group application may include information and links to any of the members of the group, enabling the user to select the user should a phone call or a walky talky communication be needed. The user may also acquire coordinates or view a map of a location of any of the users, thus enabling the user to find the remaining members of the group, should it be necessary. Group application may be interfaced with other applications. For example, a user may select another member of the same group and view the location of the other member using the outdoor navigation application or establish a contact with the member using the walky talky PMR radio communication.

Group application may be an application that allows forming groups with owners of other mobile devices and following their location and presence on the map of the Outdoor Navigation Application. Such location and presence data may be transported via the GPRS/EDGE network and a dedicated mobile device Group Server. The application may provide various navigation options. One such option may be a Seek Member option in which one or more members of the group wish to follow another member. Another option is a follow me option in which all members are invited to follow one member. Another option is a direct all option in which all members are invited to be directed to one joint target. In addition, the Group Members can communicate to each other via the PMR functionality and can instantly share objects like instant messages, photos, sound recordings and tracks with individual group members or with the whole group.

Walky talky applications may include functions, programs, algorithms and interface for communicating via radio frequencies. Walky talky applications may utilize PMR module to establish communication and data transmission with other mobile device users via radio frequencies, including the PMR dedicated frequencies and channels described above. Walky talky application may enable the user to talk to other users using a channel which may be accessible to all the users in the area. In some embodiments, the channel may be accessible only to the two users communicating. Walky talky application may be used for transmitting data or information between two mobile devices. The data or information may include any information or data described herein, including the GPS coordinates of users and data of any applications or functions described herein.

In some embodiments, information about the coordinates or location and presence data for the GPS navigation applications among members is transmitted via digital PMR. In some embodiments, information about GPS coordinates or location and presence data may be transmitted via GPRS/EDGE and/or the mobile device Group server. In such embodiments, users operate the Group application in areas without cellular network coverage (and free of charge). Voice communication via mobile device Group server (push over cellular technology) may allow the users to have voice communication with their group members over longer distance than what is enabled by PMR (data transport cost is incurred for group communication).

Bundled applications may include any collection or group of applications for the user, including applications for sensors, such as the barometer, barometric altimeter, compass, accelerometer, and proximity sensor. These applications may enable the user to access applications for configuring or setting these sensors. In some embodiments, the user may use one of the bundled outdoor applications to access an application for the barometer or the barometric altimeter. In some embodiments, the user accesses a compass application in order to use a compass for orientation and navigation purposes.

Barometric altimeter application may be used for determining a height above the sea level, such as for example in mountain climbing expeditions. A barometer sensor of mobile device 100 may be interfaced with a sensor manager which may process the signal from the sensor. Sensor manager may convert the barometer sensor input signal into a signal that may be proportional to pressure on a pressure scale such as Pascal. The barometer may be calibrated for pressure and temperature. The barometer may be calibrated to compensate for any variations in reading due to change in temperature. As such there may be adjustments made to barometer or to the altimetric measurements based on the ambient temperature of mobile device and this change may be implemented in the system and unnoticed by the applications. Thus, a navigation application displaying the location coordinates and the altitude may use most correct of the barometer or the GPS altitude data to determine the altitude of the user carrying the mobile device. In some embodiments, mobile device may determine the barometer readings based on the more correct of the GPS altitude data or the barometer sensor.

Barometric altimeter may be calibrated or zeroed in order to more accurately perform measurements. Barometer may provide more correct measurement than the GPS signal as GPS altitude value may invariably jump with a greater degree of error. This reading may be stabilized using the barometer sensor and an application that uses the barometric reading to determine the latitude rather than reading from the GPS signal's estimation of altitude. The application may determine the latitude using the barometric sensor readings. However, the barometer may be zeroed based on some recent valid GPS data. In one embodiment, an algorithm continuously monitors GPS precision with sliding time window. If GPS error remains below a specific threshold for error percentage for a predetermined duration of time, the algorithm may use the GPS barometric value to zero the altimeter with average value altitude reading over this time. For example, if GPS error remains below an error percentage threshold, such as below 1% for a duration of 30 seconds, the algorithm may average the GPS barometric value and zero the barometric altimeter reading using this value. Zeroing may entail replacing the previous value of the barometer sensor with the new value. Using this method, in instances in which the GPS readings have low error percentage the barometric altimeter readings may be more accurately determined. Alternatively, in some embodiments, more accurate barometric readings may be determined using GPS altitude data for low error GPS readings using the same or a similar algorithm.

As such a GPS unit may receive a barometer related reading using GPS altitude precision and the algorithm may use this altitude to determine or estimate the barometric reading. However, should GPS module detect a low error reading for a duration of time, barometric sensor may be zeroed with the GPS reading and applications may use the new value for the barometric readings. As such, the GPS navigation application, such as LocationProvider may use the most correct barometric reading, whether that be from the barometric sensor device or the GPS altitude signal.

In some embodiments, a user may know his or her precise altitude and may use that value to correct the altitude value on the system. The user may have an independent barometer and may use the read value to update mobile device system. In that case the user may input the barometric reading and mobile device may calculate the most correct altitude. Mobile device may then use this altitude for determining future changes in altitude. Alternatively, the user may enter the altitude using more accurate GPS coordinates. Mobile device may determine the barometric value from this input. In some embodiments, a server containing an elevation model may update the mobile device with the latest elevation values. In some embodiments, when a user explicitly zeros the altimeter, automatic zeroing based on good GPS data may be suspended for a duration of time, such as for example two hours, three hours, four hours or five hours.

A compass application may be used to determine the accurate direction to true north from a magnetic sensor's output. A 3 axial magnetic field, strength values adjustments may be made for the orientation of the device in the gravitational field and the delta between the magnetic and true north at the present location. For the orientation of the device in the gravitational field an input from a g-sensor may be used. To determine the delta between the magnetic and true north at the present location information from GPS and/or a model of the globe may be used. Android system may include a legacy Sensor Type which may implement the G-sensor adjustment, to the return magnetic north. In some embodiments, this feature may be used by the Mobile device apps. In some embodiments, deviation between the magnetic north and the true north may be ignored. However, the magnetic north to true north difference may be very small, such as under 10 degrees in some regions. As showing north may not require high accuracy for some applications, magnetic north may be used as the true north.

An electronic compass may get influenced by magnetic fields in the environment, such as near machines or cars. Often this may affect the readings of the magnetic field sensor. This fixed offset can be calibrated out by using the sensor in a special mode (self-test mode) and getting the user to move the device in a certain way (e.g. figure of 8, rotate around 2 or 3 axes). In some embodiments, when a user notices the compass is not correctly calibrated (e.g. not in line with user's knowledge where north is), they are given the option to initiate calibration. This option may be added to the settings core application. The exact method of calibration may depend on the type of compass and the system.

Other home screens may include applications for user specific communication, such as dial pad for dialing a mobile telephone number or contacts for selecting the telephone number from an electronic phone book. Messages application may be used for SMS or MMS messages to another mobile phone. Camcorder or a still-camera may be used for taking photos or videos from the area. Gallery and MP3 player may be used for playing or viewing multimedia files, such as audio or video files. User installed outdoor, GPS and sensor-related applications may include any outdoor applications which may be used for GPS or sensors of mobile device, such as for example additional maps, additional interfaces for compass or barometric altimeter. The user may also gain access to Android applications market to download any additional applications from an application store.

Mobile device applications, partner application, bundled third party applications and android applications may include any additional software applications which may be used on mobile device. In some embodiments, third party applications may be used, such as for example Android applications from 3rd party developers that may be pre-bundled. Such applications may include solutions for specific activities or outdoor related interest, like skiing maps, snow & weather report, sports related applications with connection to heart rate belts connected by Bluetooth, etc. Furthermore the user can download (free or commercial) Android applications serving his needs from Google's Android Market or other marketplace for Android applications like Androidpit or Handango.

FIGS. 2D-2L present example embodiments of user interfaces displayed on the mobile device as the user utilizes the functions and applications of the mobile device 100, such as any of the navigation functions. In reference to FIG. 2D, an embodiment of a Dynamic Navigation Widget displayed on the display screen of the mobile device is illustrated. Walky talky application link is displayed on the screen and additional spaces for other pre-bundled third party applications are displayed as well. Dynamic navigation widget may be displayed in a screen of about 200 by 300 pixels and may provide access to the group and navigation applications. Similarly, application grid may also provide access to the group and navigation applications.

Figure 2E:
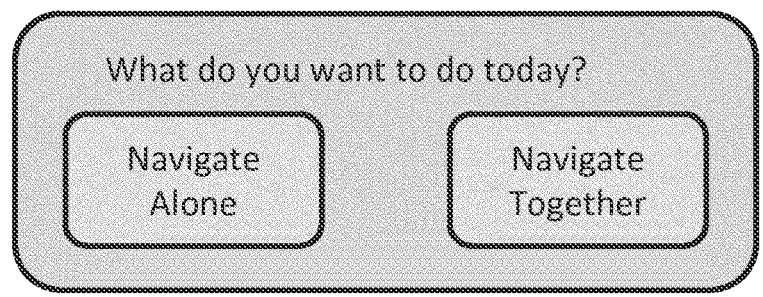
FIG. 2E are illustrations of other embodiments of displayed mobile device applications.
Figure 2E:
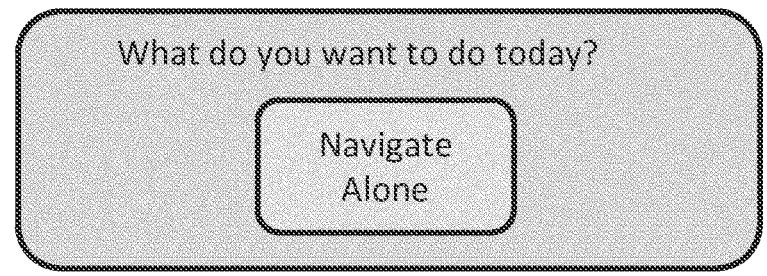

Referring now to FIG. 2E, two embodiments of welcome appearances are illustrated. A connected mode welcome appearance may be used for a user who is a member of a group of mobile device users. The user may be prompted to either navigate alone or navigate together with the group. Connected mode may involve inserting the SIM card into mobile device and having valid GPRS settings. In another embodiment, a user who is not a member of a group may be prompted to navigate alone. PND mode, or the individual mode of navigation, may involve no SIM card inserted and may be used when the user selects flight mode or PND mode from the profile.

Figure 2F:
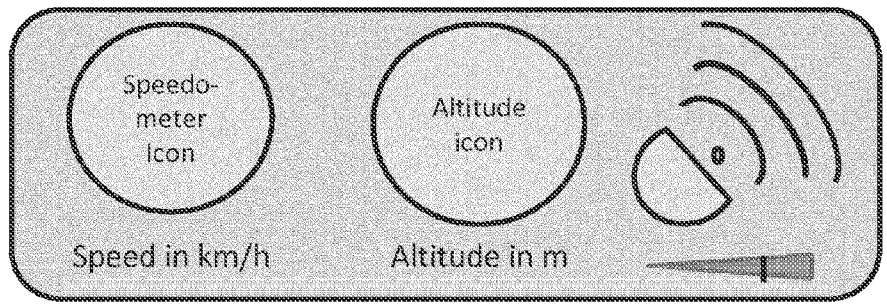
FIG. 2F are illustrations of other embodiments of displayed mobile device applications.
Figure 2F:
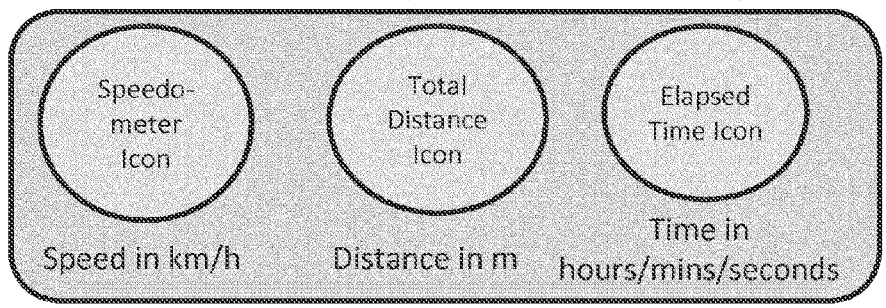
Figure 2F:
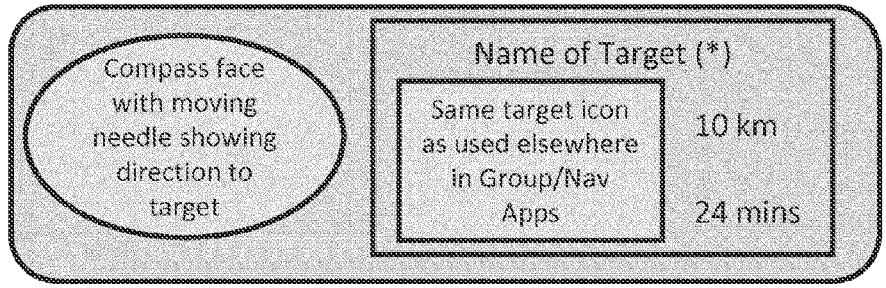

Referring now to FIG. 2F, three embodiments of navigation appearance as displayed on the display screen of the mobile device are illustrated. In the map mode, the screen may display speedometer icon along with speed in km/s, an altitude icon along with altitude in meters and the GPS signal icon along with GPS error percentage or other indicator of GPS accuracy. In the tracking mode, the screen may display the speedometer icon and the speed in km/s along with the total distance along with distance in meters and the elapsed time along with time in hours, minutes and seconds. In the navigation mode, the screen may display the compass face with moving needle showing direction to the target along with the name of the target and the distance from the target as well as the time to the target. The screen may also display the target icon as used elsewhere in the group and navigation applications.

Figure 2G:
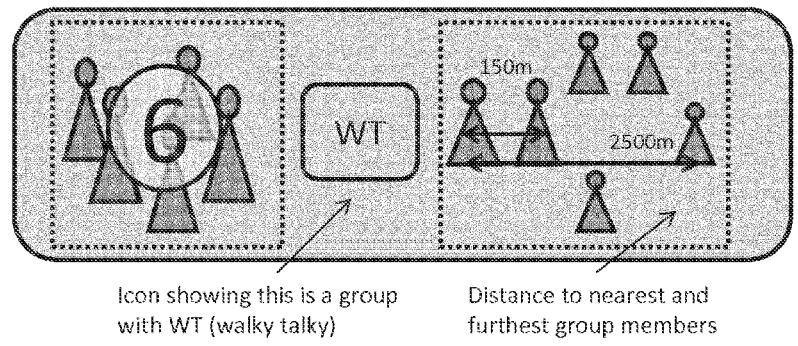
FIG. 2G is an embodiment of displayed mobile device applications.
Figure 2H:
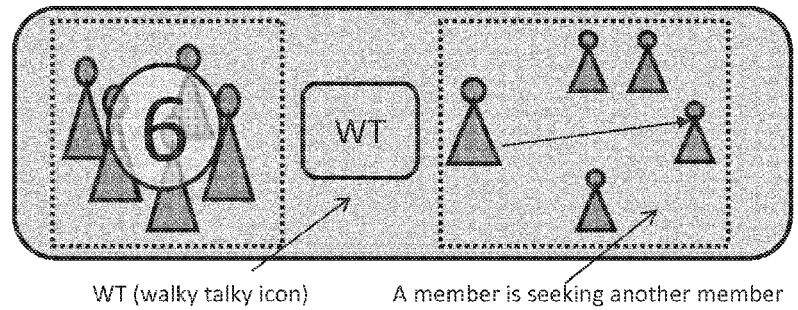
FIG. 2H is an embodiment of displayed mobile device applications.
Figure 2I:
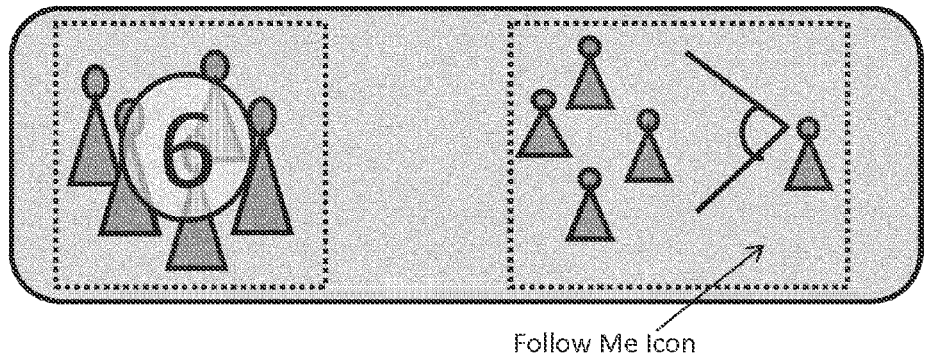
FIG. 2I is an embodiment of displayed mobile device applications.
Figure 2J:
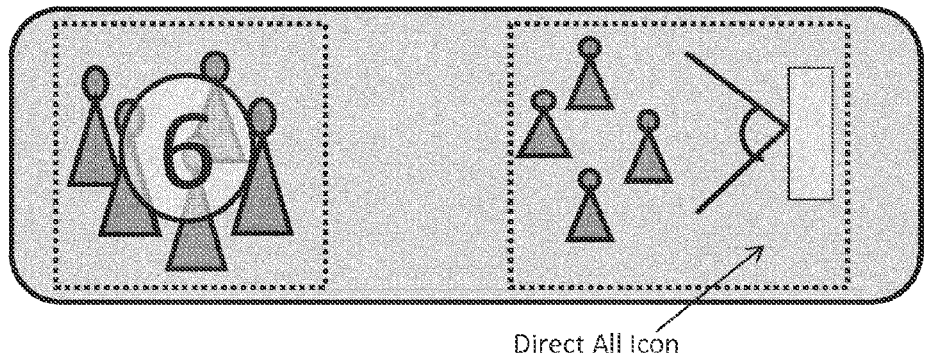
FIG. 2J is an embodiment of displayed mobile device applications.

Referring now to FIGS. 2G-J, embodiments of dynamic navigation widget navigation appearance are illustrated. In FIG. 2G, an embodiment of a dynamic navigation widget of a group mode display having no navigation operations is illustrated. In FIG. 2H, an embodiment of a dynamic navigation widget of a group mode display in which a "seek member" operation is in operation is illustrated. In FIG. 2I, an embodiment of a dynamic navigation widget of a group mode display having "follow me" operation is illustrated. In FIG. 2J, an embodiment of a dynamic navigation widget of a group mode display having "direct all" operation is illustrated.

Figure 2K:
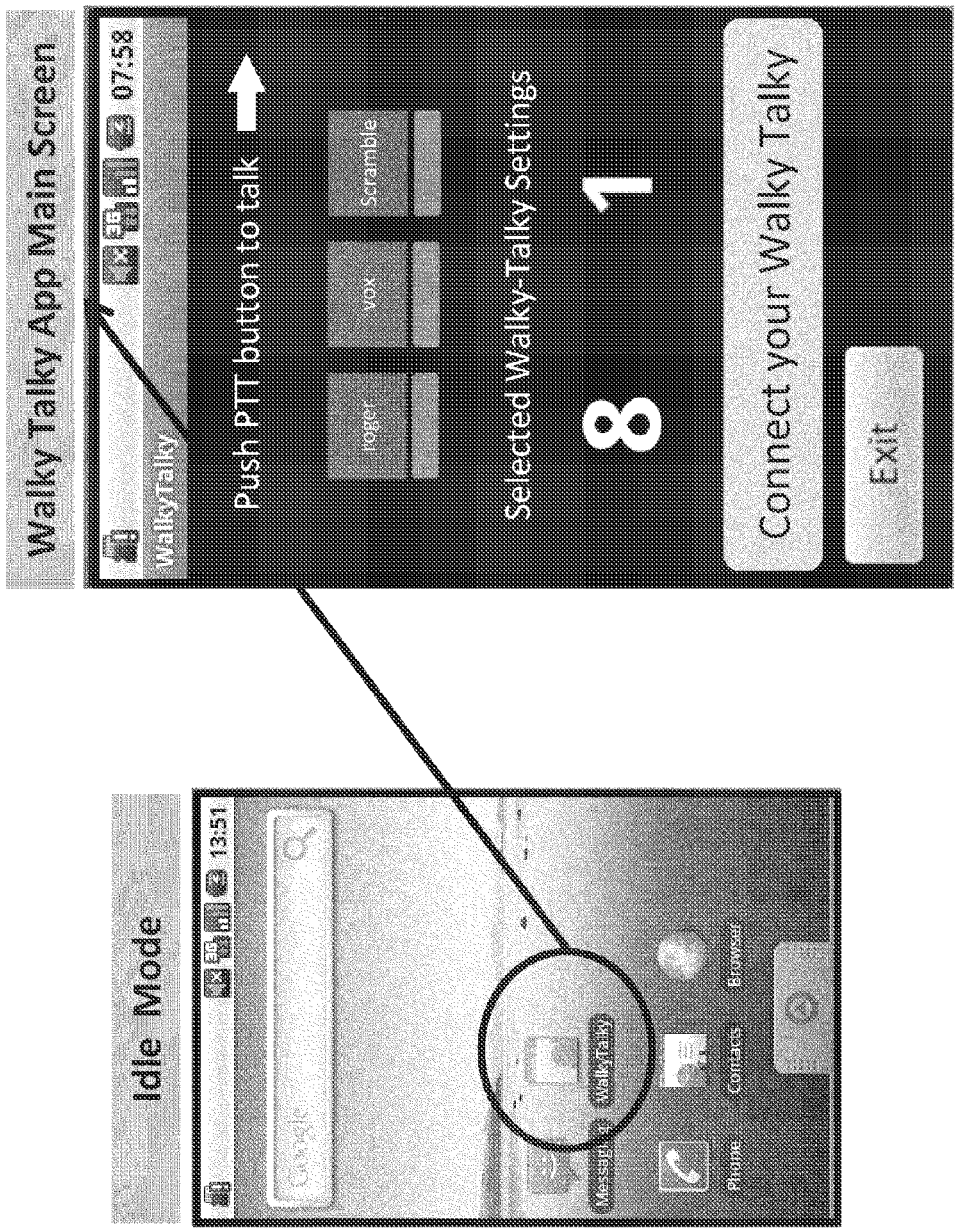
FIG. 2K are illustration of embodiments of displayed mobile device applications.

Referring now to FIG. 2K, an embodiment of a mobile device display and selection of a walky talky application is illustrated. Display screen may display any number of applications, such as the messaging application, walky talky application, phone application, contacts application, a browser application or any other application described herein. Once the user selects a walky talky application, a new screen will be displayed. The walky talky screen may provide various walky talky commands, such as "roger", "vox" and "scramble" along with a button to push for communication. Walky talky application may also provide the channel and code for communication. The channel may determine the channel via which a call will be made and the code may be an encryption code. The user may select "connect your walky talky" and upon completion of the conversation the user may select "exit" button.

Figure 2L:
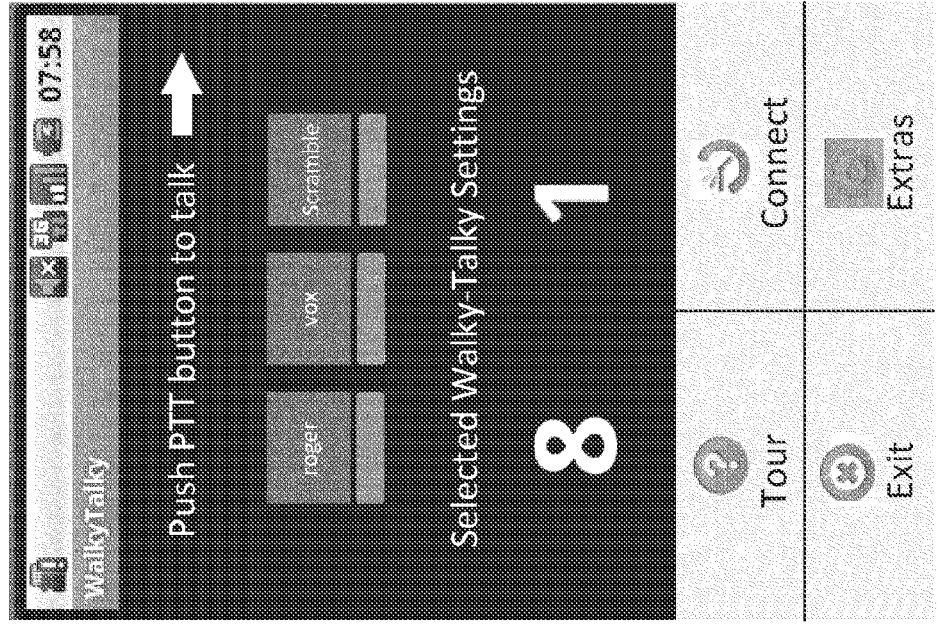
FIG. 2L is another illustration of an embodiment of displayed mobile device applications.

Referring now to FIG. 2L, another embodiment of a walky talky display screen is illustrated. In addition to previously discussed buttons and options, the user may also select "tour", "connect", "extras" and "exit" button. The function keys provided may include "done", "revert", "back" and "home". Done key may lead to the stored values and go to walky talky application main screen. Revert key may lead to former settings kept and also go to walky talky application main screen. Back button may lead to a previous screen, while the home button may lead to the home screen.

C. Modular Detachable Group Information Server

When a group of mobile device users involved in an outdoor expedition wishes to store, process or share expedition relevant data among other members of the group, a group information server may be used to implement these tasks. The group information server, herein also referred to as the group server, the server or GIS, may be a modular and a mobile computing unit attachable to and detachable from a mobile device 100. In some embodiments, group information server may be a mobile device 100 comprising a server module that includes the functionality of a group information server. The group server may receive information from the mobile devices of the group, including the GPS location information, information about bearing navigation, altitude, speed, remaining battery capacity, area or path pointers, weather, updates, comments, pictures, videos or any other data which may be generated by the group during the expedition. The server may process and store the received information onto a server or an online repository for use by other users in the future or to fetch such information in real time to make, generate or process any relevant data needed, such as way points, comments, pictures or maps for the group's location or area. The server may process the received information to generate new data by combining, relating, predicting or deducing new information from the received data. The server may also process historic data to produce journals about made trips, way points, breaks, comments, pointers or guides. The processed data may be broadcasted or sent to the users or any other device as needed.

The server may comprise a modular server unit. In some embodiments, the server is an integral component of a mobile device. In some embodiments, the modular server unit is designed as a belt holster worn by each group member. The modular server unit may be equipped with a private radio module, such as the PMR module of device 100 and may be activated as the group server by detaching the unit from the mobile device 100. Should multiple members of the group detach their modular server units and make them available as servers, a nomination or selection scheme for selecting the next group server may be employed to determine the next group information server. The server selection scheme may include pre-configured or default selection criteria into consideration, including information such as, but not limited to, the battery state, available memory, mean signal strength as seen from all main units, the user's own experience with respect to the expedition, or any user selected assignment for selecting the next server of the group.

Depending on the design, the modular server unit may be a component or a module comprised by a mobile device 100, such as an integral component within a mobile device 100. In such embodiments, each mobile device includes a modular server unit that is turned on and available to be used as the group server. The integrated modular server unit may be turned on when a mobile device is turned on, or may be turned on as a function of the mobile device 100.

In some embodiments, a group server may be selected from any of the mobile devices 100 of the group as each of the devices comprises an available modular server unit within the device. As a mobile device 100 is turned on, each of the devices of the group may be used as the group server. The group server may be selected based on the server selection scheme. In some embodiments, the group server is not selected based on the scheme. In some embodiments, the group server for the group is designated for a particular mobile device 100.

When a group server unit on which the group server executes is attached to the device 100, the server's radio module may be disabled. In a group of such devices, one of the detached server units may be used as the server, while any other modular server units may be disabled from acting as the group server. In other embodiments, mobile devices comprise a group server unit as an integral component and the group server units may be enabled or disabled either by a user, by the mobile device itself or by the acting group server. Upon being activated as the server, the group server may listen for any information from known group members. Any authorized requests from the group members to access the stored information may be served with a server identifier of the server 200 and a time stamp. Responses from the server may be recorded but not processed by all members of the group onto their detachable additional units. As such, the group server units may comprise the history of the acting server responses. At any time, another group server unit may take over the role of the active server and begin executing the group server functions and performing services for the group members.

When a prior acting server's detached unit is once again re-attached to the mobile device 100, the unit may send a sign off broadcast to the group members. If only one other additional unit is detached and available, the broadcast signal may be used as a trigger to activate the new additional unit to activate the new unit as the server. In some embodiments, a renewed nomination process is triggered to determine the new server for the group. In further embodiments, an internal group server unit module of a mobile device 100 transmits the signal to sign off as the group server.

In one example, mobile devices 100 of a group may communicate their coordinates or other location information to the server via a private radio communication, such as the PMR radio channel. The location information from a mobile device 100 may be encrypted and may not be decrypted by other mobile devices 100 in the area. The server may decrypt the received information using an encryption/decryption key that is specific to this mobile device 100. The server may further consolidate the location information along with the location information of other mobile devices, thus generating the combined data of the location of the group. The server may store the location information either locally or in a remote online repository server. Upon request, the server may provide the requestor with a range of historic location information for any particular mobile device of interest, thus outlining the history of movement and locations travelled by the user using the mobile device 100. The server may also provide the requestor with data regarding the speed of the user's movement, historic location information for each mobile device and information about prior group trips. The server may receive location coordination updates from each of the mobile devices 100 of the group on a regular or periodic basis. When one of the devices fails to update the server of the location, the server may send a request for the location information to this specific mobile device. In one embodiment, mobile devices 100 of the group update the server with their information periodically every 30 or 60 seconds. In some embodiments, the mobile devices 100 send their information based on a data request from the server. In other embodiments, the user of the mobile device 100 instructs the device 100 to send the location update transmission to the server. The location information is not transmitted to the server based on a voice communication.

Figure 3A:
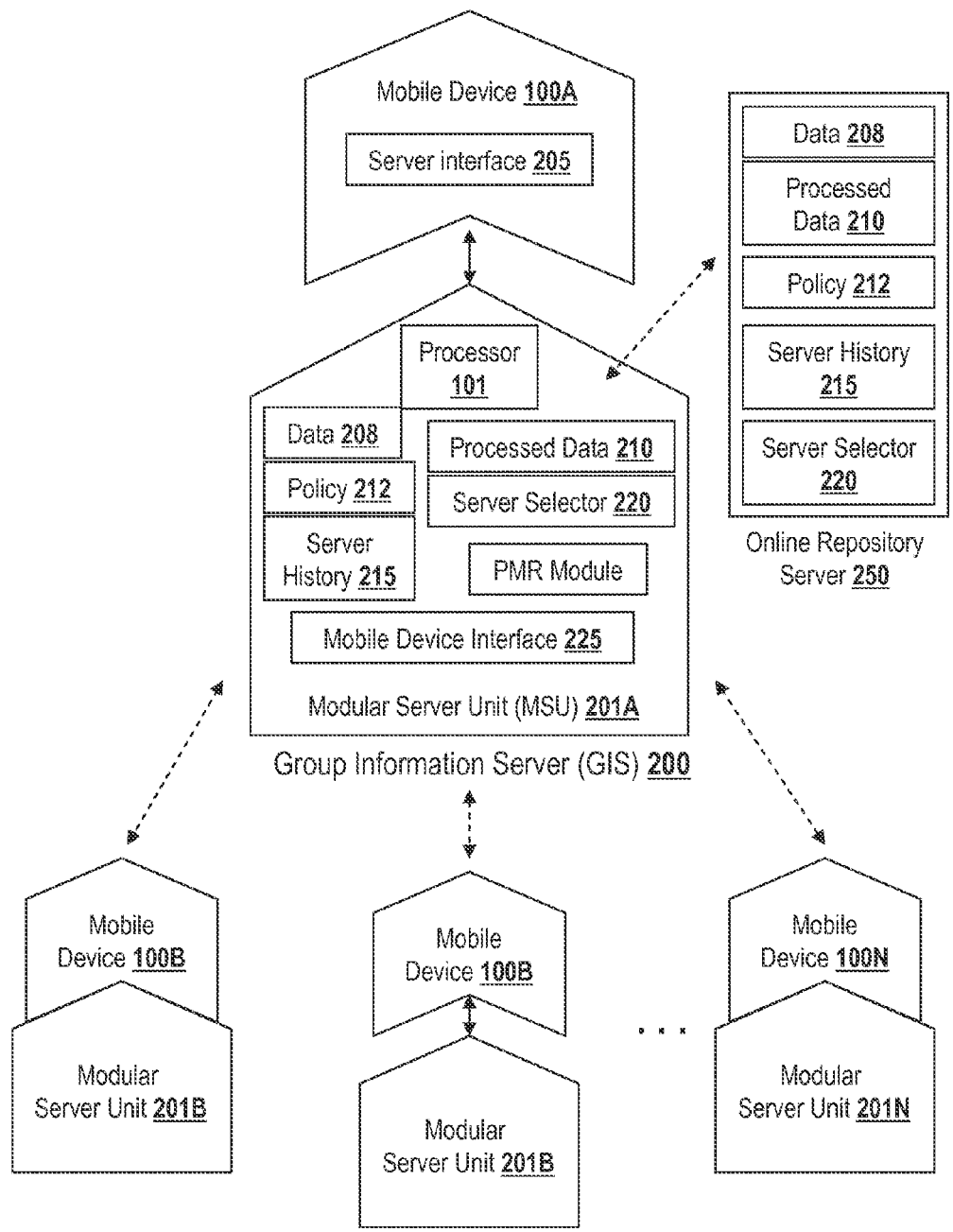
FIG. 3A is a block diagram of a system for providing, by a modular and detachable group information server, services to a plurality of mobile devices.

Referring now to FIG. 3A, an embodiment of a system comprising a group information server 200 along with mobile device 100 is illustrated. In brief overview, a modular server unit (MSU) 201A acting as a group information server (GIS) 200 is detached from a mobile device 100A that corresponds to MSU 201A. In some embodiments, MSU 201A is an integral component or a module of mobile device 100A that supports GIS 200 functionality. Mobile device 100A may comprise a server interface 205 for interfacing with the given MSU 201A via the mobile device interface 225 on the MSU

201A. MSU 201A may also include a processor 101, a PMR module, data 208, processed data 210, one or more policies 212, server history 215 and a server selector function 220. The group information server 200, herein also referred to as GIS 200, may be in a wireless communication with other mobile devices 100 and their corresponding MSUs 201. These other mobile devices 100 and MSUs 201 may comprise mobile devices 100B and 100C through 100N and the MSUs 201B and 201C through 201N. GIS 200 may further be in communication with an online repository server 250 that stores the copies or back-ups of data 208, processed data 210, policy 212, server history 215 and server selector 220. GIS 200 may receive information and data from the mobile devices 100B through 100N and process and store the information and data. GIS 200 may also transmit the processed information to the mobile devices 100B-N. In the illustrated embodiment, mobile device 100B is detached from MSU 201B, thus making the MSU 201B available to act as GIS 200 should MSU 201A cease serving the function of GIS 200. As such, MSU 201B may take over the functions of GIS 200 once MSU 201A is no longer the group information server. In some embodiments, each MSU 201 is an integral component of a mobile device 100 and available to perform GIS 200 functionality upon being selected as the next GIS 200 of the group.

Referring now to the components introduced by FIG. 3A in a greater detail, a server interface 205 of a mobile device 100 may comprise any type and form of interface for connecting to or interfacing with an MSU 201. Server interface 205 may comprise any hardware, software or a combination of hardware and software for interfacing with an MSU 201. Server interface 205 may include any latch, connector, clip, base, holder or any mechanical or physical component for holding, latching to, attaching to or interfacing with an MSU 201 via the interface of the MSU 201. Server interface 205 may also include any electrical or electronic interface for maintaining electronic communication between the mobile device 100 and the MSU 201 via the server interface 205 and the mobile device interface 225 on the MSU 201. In further embodiments, server interface 205 comprises a communication interface, such as a connector port capable of transmitting signals between the mobile device 100 and the MSU 201.

The system may be designed and constructed such that the MSU is a device attachable, connectable or interlocked to the mobile device 100. The MSU may also be a module comprised within a mobile device 100 which is not separable or detachable from the mobile device 100. When in a detached form, MSU may comprise any form factor, and may be designed to be part of or formed as a holster or a belt, which may be used by outdoor enthusiast on an outdoor expedition or by climbers while climbing a mountain. The holster or the belt may have an MSU 201 attached to the belt or the holster. The MSU may be part of a mobile base that is connectable to the mobile device. The MSU may comprise any portable device that is inserted, connected or attached to the mobile device or vice-versa. The MSU may be designed and constructed to be part of or included in any wearable form factor, such as via straps. The MSU may be designed and constructed to be part of or included in any form factor integrated with or part of any equipment used in the outdoor activity.

When detachable from the mobile device 100, the MSU and mobile device may have any type and form of physical, mechanical and/or electronic interface. Each of the interfaces may include a clip which may be connected or attached to the clip of the other interface. The interfaces 205 and 225 may include components that grab and hold onto each other, such as a connector, a latch or a fastener. The interface may be designed and constructed such that when the MSU and mobile device are connected, attached or interlocked one of either the MSU or the mobile device is disabled, wholly or partially. In some embodiments, when the mobile device is connected to the MSU, the mobile device is disabled and the MSU is enabled. In some embodiments, when the mobile device is connected to the MSU, the mobile device is enabled and the MSU is disabled. In some embodiments, when a mobile device is connected to a detachable MSU, a portion of the functionality of the mobile device is disabled, such as any communication interface, for example PMR, GPS and/or GSM module.

The MSU 201 may include its own mobile device interface 225 for interfacing with the server interface 205 of the mobile device 100. Server interface 205 of the mobile device 100 may clip onto the interface 225 of the MSU 201 enabling the mobile device 100 to be connected to, or attached to, the MSU 201. The act of attaching a mobile device 100 to the MSU 201 may result in a button being pressed or a signal being sent to the MSU 201 to turn off its communication features, such as the PMR module. The button or signal may occur due to the mechanisms or electronic features of the interfaces 205 and 225. In some embodiments, the act of detaching the mobile device 100 from the MSU 201 may result in a signal being sent or a button being pressed again or un-pressed, which may enable the PMR module of the MSU 201, thus making it available to act as a GIS 200.

Modular server unit (MSU) 201 may host or act as a group information server (GIS) 200 and may comprise any functionality of a server capable of processing data and servicing mobile devices 100 of the group. As GIS 200 may execute on any MSU 201 within the group, the terms MSU 201 and GIS 200 may be used interchangeably for the purposes identifying the functionality and features of GIS 200 or MSU 201. Accordingly, MSU 201/GIS 200 may comprise hardware, software or a combination of hardware and software for processing and storing data. MSU 201/GIS 200 may comprise any logic, functions, executables, units or components for receiving data, and transmitting data. MSU 201/GIS 200 may comprise a processor 101 and a PMR module, such as the processor 101 and the PMR module or walky talky module described earlier. MSU 201 include a module integrated with the mobile device 100 and using the PMR radio module, the GPS module or any other functionality of the mobile device 100. Integrated with the mobile device or separate, MSU 201 may also comprise any other functionality of a mobile device 100, such as a battery for storing charge or energy and means for recharging the battery. MSU 201 may comprise functionality for receiving and transmitting data and information via PMR module. In some embodiments, MSU 201/GIS 200 also comprises a GSM module, GPS module, memory modules or any other hardware or software component of the mobile device 100. GIS 200 may also include the functionality for communicating with a mobile device 100 and the functionality for receiving a signal from a mobile device and transmitting a signal to the same or a different mobile device 100. GIS 200 may include the functionality for communicating with a remote server, such as an online repository server 250. GIS 200 may also include memory for storing data or information. GIS 200 may comprise the functionality for encrypting or decrypting transmissions. In some embodiments, MSU 201 is a portion of a holster worn by a user and comprising an interface for attaching to a mobile device 100.

MSU 201 and GIS 200 may comprise any functionality for receiving a transmission from a first mobile device 100A, processing the transmission to produce an output and transmitting the output of that transmission to a second mobile device 100B. In some embodiments, GIS 200 receives an encrypted message from a first mobile device 100A and decrypts the message using the encryption/decryption key for the mobile device 100A. GIS 200 may comprise the functionality to render the contents of the message, such as a parser. GIS 200 may identify that the message comprises a location information for a second mobile device 100B. Upon processing the data from the message, GIS 200 may comprise the functionality to generate a new message using the output from the processed message from mobile device 100A and transmit the new message to the mobile device 100B using an encryption/decryption key particular to the mobile device 100B.

GIS 200 may be hosted by any MSU 201 of the group. GIS 200 may comprise functionality for notifying mobile devices 100 or MSUs 201 of the group that GIS 200 is no longer serving as the group information server. Any MSU 201 of the group that is detached from the mobile device 100 may be selected to act as the new GIS 200 for the group. GIS 200 may comprise functionality for selecting the new GIS 200. GIS 200 may also include the functionality for sorting a plurality of available MSUs 201 in order from the most suitable one to be the next GIS 200 to the least suitable one. GIS 200 may include functionality to notify mobile devices 100 that the MSU 201 hosting the GIS 200 is the new GIS 200 host. GIS 200 may also include functionality that the MSU 201 hosting the GIS 200 will no longer host the GIS 200, thus enabling other MSUs 201 to be the next GIS 200.

Data 208 may comprise any data that may be received by GIS 200 or the MSU 201 hosting the active GIS 200. Data 208 may comprise location information, GPS data coordinates, altitude information, weather information, navigation or location bearing information with respect to a specific site. Data 208 may include information about speed, remaining battery capacity, area or path pointers of the general region, weather, updates regarding the trip, pointers and locations of specific paths or shortcuts, comments, pictures, audio files or videos as well as any other data which may be generated by the members of the group. For example, group members may include into mobile devices 100 information about the location of particular shortcuts, paths, alleys, meadows, trees, rocks, mountain paths, cliffs, skiing trails, streams, ponds, sources of water, plants, animals or any other information of interest. Data 208 may comprise information from a single mobile device 100 or from a plurality of mobile devices 100. Data 208 may be a collection of all data from all mobile devices 100 of the group. Individual user data may be organized separately or may be stored together with the data of other users. Data 208 may include any commands or instructions, such as an instruction to send a message to another mobile device 100. Data 208 may also include information about the status of a mobile device 100 with respect to its corresponding MSU 201, such as the information whether the MSU 201 of the user is attached to or detached from the mobile device 100.

Processed data 210 may comprise any output of the data 208 processed by the GIS 200. Data 210 may include any information deduced, predicted or calculated from the data 208. Processed data 210 may include consolidated historical data for producing journals about the trips made, way points or pointers for paths in a wooded area, shortcuts, interesting sites noticed by other members or users, breaks, comments, pointers or guides. Processed data 210 may include a map of locations or sites that are not marked on conventional maps, but rather included by one or more members of the group. For example, processed data 210 may include data 208 from all individual mobile devices 100 consolidate onto a single map along with locations of various points of interests of all the members and including the locations of any of the sites, paths, streams, ponds, animals, water sources, trees that all of the members of the group contributed. Processed data 210 may comprise a path of a particular member or a plurality of members, including the historical location points. Processed data 210 may include the speed with which a member traveled through an area as well as any graphical or video recordings of the area.

Policy 212 may comprise any one or more policies, rules or logic for governing the processing and sharing the information and data among the group. Policy 212 may comprise functions, rules, algorithms or components for determining how to process and share information with any individual mobile device 100 or with entire group. Policy 212 may comprise functionality for determining which encryption key to use with which mobile device 100. In some embodiments, each mobile device is assigned a particular key. In other embodiments, a group of mobile devices are assigned a particular key. Policy 212 may process information for a particular mobile device 100 user by excluding some data or points which are not meant to be transmitted to that user. Policy 212 may be an access policy, enabling GIS 200 to determine which user should have access to which data. For example, policy 212 may indicate that some mobile device 100A should not have data regarding the whereabouts of mobile device 100B. In such instances, GIS 200 may exclude the data from the mobile device 100B when generating the output for mobile device 100A. Policies 212 may be user based or group based. In some embodiments, policy 212 generates one output for one mobile device 100A and another output for another mobile device 100B using the same inputs based on different policies for different users. Policy 212 may monitor the PMR radio signal of each of the mobile devices as well as the GIS 200 and determine whether or not and how to transmit the messages to the mobile devices 100. In some embodiments, policy 212 determines to switch from a private radio communication transmission and start transmitting using Bluetooth, WLAN, WiMAX, GSM/GPRS, or any other communication method available.

Server history 215 may comprise any collection of the commands and transmissions of the GIS 200. As GIS 200 may be hosted by any MSU 201, server history 215 may notify any future GIS 200 about decisions or transmission that a prior GIS 200 implemented. For example, a server history 215 may include a selection of decisions, transmissions, settings or specific tasks that any prior GIS 200 implemented along with the unique identifier of that particular MSU 201 or its corresponding mobile device 100. Thus, any future GIS 200 may review the history and be aware of the prior decisions and transmissions as well as having information to identify the particular member, MSU 201 or mobile device 100 that implemented that decision or transmission. For example, GIS 200 hosted on MSU 201A may set up a folder for storing video files of the group on an online server repository server 250. Some time later, GIS 200 hosted on MSU 201B may become aware of the folder from the server history 215 and store any future media or video files in the same folder. In some embodiments, GIS 200 updates the server history 215 on each of the MSUs 201 of the group via PMR radio as the server history 215 is updated and modified. As such each of the MSUs 201 includes the most updated server history 215 at the moment of becoming GIS 200. In other embodiments, the previous GIS 200 transmits the server history 215 to the new GIS 200 following the exchange of the responsibility from the MSU 201 that hosted the previous GIS 200.

Server selector 220 may comprise any logic, algorithm or function for determining or selecting the MSU 201 that will host the GIS 200 once the MSU 201 presently hosting the GIS 200 becomes unavailable. Server selector 220 may comprise any selection function, program or executable for sorting the available MSUs 201 of the group from the most fit to host GIS 200 to the least fit to host GIS 200. Server selector 220 may comprise various information regarding MSUs 201 of each of the members of the group, including the signal strength, geographical location, remaining battery available, information regarding the user using the MSU 201 or any other information which may be used to determine the most suitable MSU 201 to host GIS 200. In some embodiments, the MSU 201 with most battery life available is selected to be the most suitable. In other embodiments, the MSU 201 with the best geographical location to communicate with other group members via PMR radio is selected. In further embodiments, MSU 201 is selected based on the user of the MSU 201 which may be the leader or the guide of the group. Server selector 220 may comprise the functionality to send a command to the MSU 201 the most fit or most suitable to host the GIS 200. The command may instruct the MSU 201 to activate the GIS 200. The command may be issued responsive to the signal indicating that the MSU 201 presently hosting GIS 200 has just been attached to its corresponding mobile device 100.

Mobile device interface 225 of a MSU 201 may comprise any type and form of interface for interfacing with an MSU 201. Mobile device interface 205 may comprise any hardware, software or a combination of hardware and software for interfacing with a mobile device 100. In some embodiments, mobile device interface 225 comprises a latch, a connector or a clip for connecting with or attaching to the mobile device 100. In further embodiments, mobile device interface 225 comprises a communication interface, such as a connector port capable of transmitting signals between the mobile device 100 and the MSU 201. In more embodiments, mobile device interface 225 comprises a holder for a mobile device 100. The mobile device interface 225 may comprise functionality for triggering a signal upon attaching to or detaching from the MSU 201.

Figure 3B:
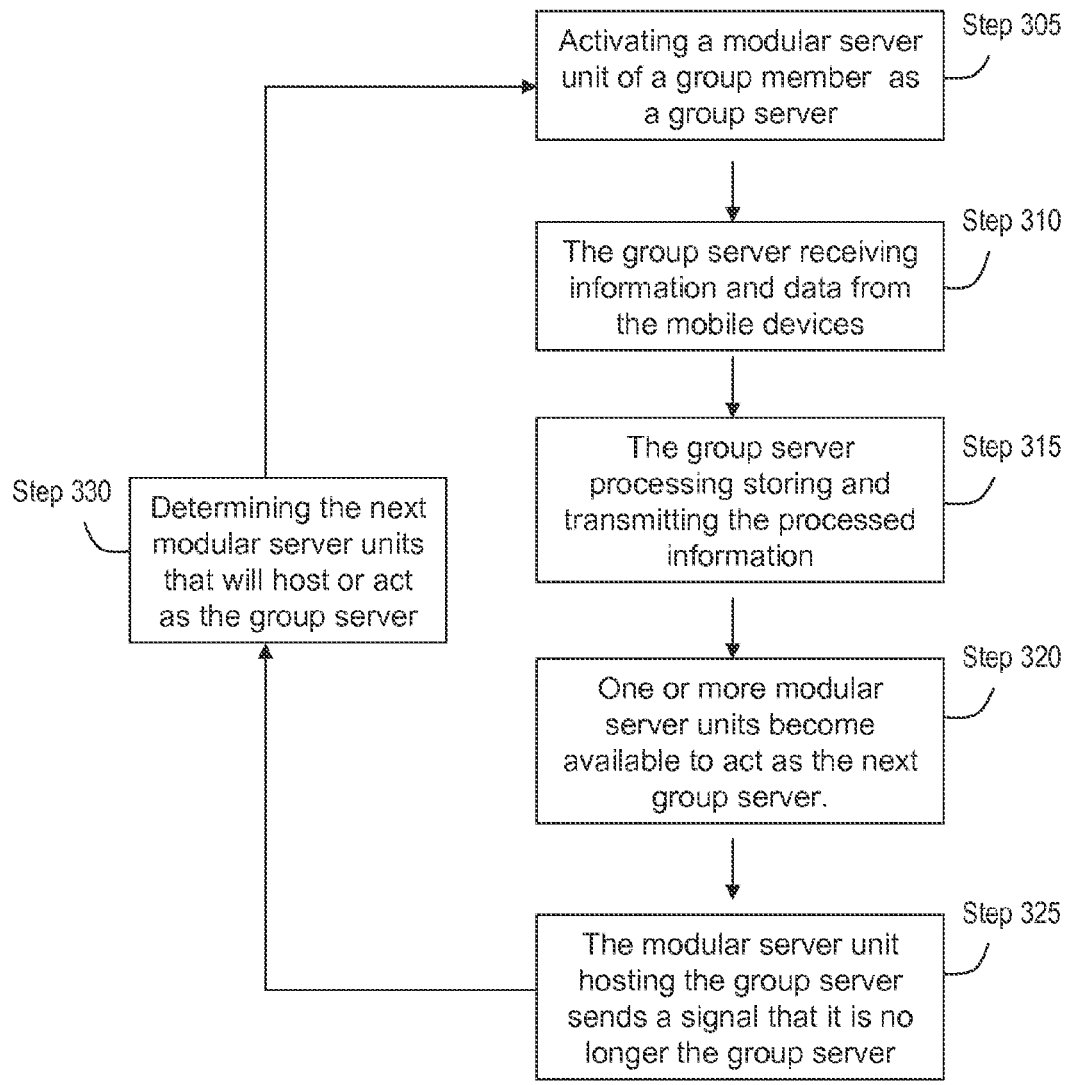
FIG. 3B is a flow diagram of embodiments of a method for providing, by a modular and detachable group information server, services to a plurality of mobile devices.

Referring now to FIG. 3B, an embodiment of a method of steps for providing, by a group information server, services to a plurality of mobile devices is illustrated. The group information server may either be modular and detachable from the mobile device 100 or an integral part of the mobile device 100. In brief overview, at step 305 a modular server unit (MSU) 201 of a group member is activated as a group server or GIS 200. At step 310, the group server receives information and data from one or more mobile devices of the group. At step 315, the group server stores and processes the received information and data and transmits the processed information and data among the peers. At step 320, one or more modular server units becomes available to host or to become a group server should the MSU 201 presently acting as the group server cease to perform this function. At step 325, the MSU 201 presently acting as the GIS 200 sends a signal to the mobile devices 100 of the group that this MSU 201 will no longer serve the function of the group server. At step 330, a determination is made to identify the next modular server unit that will host, function or act as the next group server, thus taking over the functions of the GIS 200.

At step 305, an MSU 201 is activated as a group information server (GIS), such as for a group of mobile device. The group of mobile devices may be established by a group of users who want to form a group, such as for a group activity. The group of mobile devices may be established by a plurality of mobile devices in proximity to each other and/or under control or held by such users. The group of mobile devices may be established by a grouping function or application executing on each of the mobile devices. receiving, by each mobile device of the group, information on a number of mobile devices of the group and identification of each mobile device. Via one or more communication and/or grouping schemes of the grouping function/application, each of the mobile devices may identify and communicate other devices to be part of and form the group.

MSU 201 may be a part of a holster which may interface with and hold a mobile device 100. Upon detaching the mobile device 100 from the holster portion interfacing with the MSU 201, MSU 201 may become available to be activated as the GIS 200. In other embodiments, MSU 201 is an integral component of the mobile device that is activated as the GIS 200 based on a received instruction or an internal scheme or an algorithm. In some embodiments, the MSU 201 receives an information indicating that this MSU 201 is identified and selected as the MSU 201 that will function as the GIS 200. In other embodiments, MSU 201 assumes the role of the GIS 200 responsive to a received indication that the MSU 201 that previously acted as the GIS 200 will no longer act as the GIS 200. MSU 201 may be activated as the GIS 200 based on a timer. For example, MSU 201 may be designated to act as the GIS 200 for a duration of time beginning at a particular time. In one embodiment, MSU 201A may be activated as the GIS 200 by a command or instruction from the MSU 201B hosting the GIS prior to the MSU 201B signing off as the acting GIS 200. In some embodiments, a MSU, having a private radio module and detachable from and interfaced to a mobile device of the group of mobile devices, is activates as a group server for the group of mobile device a modular server unit responsive to detaching the modular server unit from the mobile device and the private mobile radio of the mobile device is deactivated responsive to activating the modular server unit At step 310, the GIS 200 receives information and data from one or more mobile devices of the group. In some embodiments, GIS 200 receives an information and/or data from a mobile device of the group. In further embodiments, GIS 200 receives the information and/or data from each of the mobile devices of the group. GIS 200 may receive the information and data periodically, such as each 30 seconds, 45 seconds, 60 seconds, 90 seconds, or 120 seconds, or every 3 minutes, 4 minutes, 5 minutes, 10 minutes, 15 minutes or 30 minutes. The information or data received may comprise any information or data, such as data 208. In some embodiments, GIS 200 receives from one or more mobile devices a location information, such as the GPS data coordinates or altitude information. GIS 200 may also receive weather information, navigation or location bearing information with respect to a site, information about speed or information about remaining battery capacity of a mobile device 100 or a MSU 201. GIS 200 may also receive information about the particular area or region in which the group is deployed as well as information about path pointers within the general region, such as the locations of specific paths or shortcuts, or the location of particular shortcuts, paths, alleys, meadows, trees, rocks, mountain paths, cliffs, skiing trails, streams, ponds, sources of water, plants, animals or any other information of interest. GIS 200 may receive any information about the weather, updates regarding the trip, comments, logs, pictures, audio files or videos as well as any other data which may be generated by the members of the group. In some embodiments, the MSU receives data about one or more of the following: location, bearing, altitude, speed, and remaining battery capacity.

At step 315, GIS 200 processes and/or stores the information and data received and transmits the processed information to the mobile devices 100 or the online repository server 250. In some embodiments, the MSU processes the received data to consolidate the data. In some embodiments, the MSU processed the received data by one of combining, relating, predicting or deducing new information from the received data to have the consolidated data comprise the new information. In some embodiments, the MSU may process previously received data stored on the MSU with the received data, such as to produce a journal, history or timeline of a trip. In some embodiments, the MSU further comprises transmitting the consolidated data via Internet protocol (IP) communications to a server, such as an online repository.

GIS 200 may store the received information into a local memory or onto the online repository server 250. GIS 200 may store any photograph, audio or video file received as well as any log or comment written by a mobile device 100. GIS 200 may process the received data and compile and consolidate the data from all the mobile device users. As GIS 200 may receive data continuously and/or periodically, GIS 200 may continuously process the data to create a consolidated output. For example, GIS 200 may create an updated map of the region with the latest locations of the mobile device users. GIS 200 may also update the map to include the prior locations of the users, thus enabling some of the users to see the paths travelled by other users. GIS 200 may also update the map of the area to include the latest altitudes, latest sites discovered, links to pictures or videos taken as well as the locations of interests, such as water sources, interesting animals or vegetation. GIS 200 may process the data received at step 310 for the entire group or the GIS may customize the data for some of the mobile device users. For example, GIS 200 may exclude some information from the output generated for some of the users and include other information into the output intended for other users. Based on policies 212, GIS 200 may determine which user should or should not have the access to which information. Accordingly, GIS 200 may produce the output responsive to the access policy based on each user. In such instances, different mobile devices 100 may receive outputs customized for that mobile device 100 alone.

At step 320, one or more MSUs 201 of the group become available to host or act as the next GIS 200. As one or more MSUs 201 of the group become detached from their corresponding mobile devices 100, the MSUs 201 may transmit the signal indicating that they are available to become GIS 200. To become available as the GIS 200, the MSU 201 may first activate the private radio module or the PMR module. While the mobile device 100 is attached to the holster of the MSU 201, the PMR radio module of the MSU 201 may be turned off. In some embodiments, a user may detach a mobile device from the holster comprising the MSU 201 and the act of detaching the interface of the mobile device 100 from the interface of the MSU 201 turns on the PMR module and triggers the signal that the MSU 201 is available to act as the GIS 200. In other embodiments, a predetermined function may command the MSU 201 to activate as an available host for the GIS 200. The signal from the MSU 201 may be transmitted via the PMR module to all the mobile devices 100 in the area. In other embodiments, the signal may be transmitted via any other wireless network or means, such as WLAN, Bluetooth, WiMAX or via GSM/GPRS. In some embodiments, MSU 201 is an integral component of a mobile device 100 which is available to host or act as the GIS 200. In such embodiments, MSU 201 may become available to host GIS 200 based on a received signal from the present GIS 200 or a scheme which may operate internally or externally on another mobile device. MSU 201 may become available to host GIS 200 based on the characteristics of the mobile device 100 comprising the MSU 201, such as the battery power available, signal strength or the geographical location of the mobile device 100 with respect to other mobile devices 100 of the group.

At step 325, the MSU 201 presently acting as the GIS 200 sends a signal indicating that this MSU 201 will no longer act as the GIS 200 for the group. In some embodiments, the signal is sent responsive to attaching the MSU to the mobile device. The private mobile radio of the MSU is deactivated upon attachment and the private mobile radio module of the mobile device activated responsive to the attachment of the MSU. The signal may be triggered by an action of the user attaching the mobile device 100 back to the MSU 201. The attachment of the mobile device 100 to the holster of the MSU 201 may turn off the PMR module of the MSU 201. In some embodiments, MSU 201 may transmit the signal and stop acting as the GIS 200 responsive to a determination that the MSU 201 hosting the GIS 200 has a battery that is running out of energy. In other embodiments, MSU 201 may transmit the signal responsive to a determination that the available battery power is no longer sufficient to act as the GIS 200. MSU 201 may transmit the signal responsive to determining that the signal strength of the mobile device 100 comprising the MSU 201 is no longer sufficient or that the mobile device 100 is no longer in the optimal location with respect to other mobile devices 100 of the group.

At step 330, the next MSU 201 to host the GIS 200 is identified from one or more available MSUs 201. In some embodiments, a plurality of modular server units are detached from corresponding mobile devices in the group of mobile devices and one or more of the mobile devices executes a nomination scheme to select one of the modular server units from the plurality of modular server units as the group server. In some embodiments, the acting GIS 200 uses server selector function to identify the most suitable MSU 201 to act as the next GIS 200. For example, GIS 200 may utilize server selection function to determine which of the MSUs 201 available for serving as GIS 200 have a battery that is charged enough to perform the task. In some embodiments, GIS 200 may select the MSU 201 based on the geographical location of the MSU 201 with respect to the locations of other group members. For example, an MSU 201 may be closer towards the middle of the group thus having a stronger PMR radio signal with all the remaining members, making this MSU 201 the best candidate to communicate with the members via PMR radio system. In some embodiments, GIS 200 selects the MSU 201 based on the user using the mobile device 100 and the MSU 201, such as a guide of a group.

What is claimed:

1. A method for establishing a group server for a group of mobile devices comprising a private mobile radio module, the method comprising:

(a) establishing a group of mobile devices, each of the mobile devices comprising a private mobile radio module to communicate with other mobile devices of the group;

(b) activating as a group server for the group of mobile device a modular server unit detachable from and interfaced to a mobile device of the group of mobile devices responsive to detaching the modular server unit from the mobile device, the modular server unit comprising the private mobile radio, the private mobile radio of the mobile device deactivated responsive to activating the modular server unit;

(c) receiving, by the modular server unit via the private mobile radio, data from a plurality of mobile devices of the group of mobile devices;

(d) processing, by the modular server unit, the received data to consolidate the data; and (e) transmitting, by the modular server unit via the private mobile radio, the consolidated data to each of the mobile devices of the group.

2. The method of claim 1, further comprising sending, by the modular server unit, a signal that the modular server unit will no longer act as the group server for the group.

3. The method of claim 2, further comprising sending the signal responsive to attaching the modular server unit to the mobile device, the private mobile radio of the modular server unit deactivated upon attachment and the private mobile radio module of the mobile device activated responsive to the attachment of the modular server unit.

4. The method of claim 2, further comprising selecting a second modular server unit, detachable from and interfaced to a second mobile device of the group, as the group server.

5. The method of claim 1, wherein step (c) further comprises receiving, by the modular server unit, data about one or more of the following: location, bearing, altitude, speed, and remaining battery capacity.

6. The method of claim 1, wherein step (d) further comprises processing, by the modular server unit, the received data by one of combining, relating, predicting or deducing new information from the received data, the consolidated data comprising the new information.

7. The method of claim 1, wherein step (d) further comprises processing, by the modular server unit, previously received data stored on the module server unit with the received data to produce a journal of a trip.

8. The method of claim 1, wherein step (e) further comprises transmitting, by the modular server unit, the consolidated data via Internet protocol (IP) communications to an online repository.

9. The method of claim 1, further comprising detaching a plurality of modular server units from corresponding mobile devices in the group of mobile devices.

10. The method of claim 9, further comprising executing a nomination scheme to select one of the modular server units from the plurality of modular server units as the group server.

11. A system for establishing a group server for a group of mobile devices, the system comprising:
a group of mobile devices, each of the mobile devices comprising a private mobile radio module to communicate with other mobile devices in the group;
a modular server unit detachable from and interfaced to a mobile device of the group of mobile devices and comprising a private mobile radio, the modular server unit activated as a group server for the group responsive to detaching the modular server unit from the mobile device; and
wherein the private mobile radio module of the mobile device is deactivated responsive to activating the modular server unit; and
wherein the modular server unit receives via the private mobile radio, data from a plurality of the mobile devices of the group of mobile devices, processes the received data to consolidate the data; and transmits via the private mobile radio the consolidated data to each of the mobile devices of the group.

12. The system of claim 11, wherein the modular server unit sends a signal that the modular server unit will no longer act as the group server for the group.

13. The system of claim 12, wherein the modular server unit sends the signal responsive to attaching the modular server unit to the mobile device, the private mobile radio of the modular server unit deactivated upon attachment and the private mobile radio of the mobile device activated responsive to the attachment of the modular server unit.

14. The system of claim 12, further comprising selecting a second modular server unit, detachable from and interfaced to a second mobile device of the group, as the group server.

15. The system of claim 11, wherein the modular server unit receives data about one or more of the following: location, bearing, altitude, speed, and remaining battery capacity.

16. The system of claim 11, wherein the modular server unit processes the received data by one of combining, relating, predicting or deducing new information from the received data, the consolidated data comprising the new information.

17. The system of claim 11, wherein the modular server unit processes previously received data stored on the module server unit with the received data to produce a journal of a trip.

18. The system of claim 11, wherein the modular server unit transmits the consolidated data via Internet protocol (IP) communications to an online repository.

19. The system of claim 11, wherein a plurality of modular server units are detached from corresponding mobile devices in the group of mobile devices.

20. The system of claim 19, wherein one of the modular server units or one of the mobile devices executes a nomination scheme to selects one of the modular server units from the plurality of modular server units as the group server.

* * * * *